United States Patent
Kida

(10) Patent No.: US 9,356,272 B2
(45) Date of Patent: May 31, 2016

(54) POLYOLEFIN-BASED SPLIT-TYPE CONJUGATE FIBER, FIBER ASSEMBLY AND BATTERY SEPARATOR USING THE SAME AND METHOD FOR PRODUCING THE SAME

(75) Inventor: Tatsunori Kida, Hyogo (JP)

(73) Assignees: Daiwabo Holdings Co., Ltd., Osaka (JP); Daiwabo Polytec Co., Ltd., Osaka (JP)

( * ) Notice: Subject to any disclaimer, the term of this patent is extended or adjusted under 35 U.S.C. 154(b) by 291 days.

(21) Appl. No.: 13/637,917

(22) PCT Filed: Mar. 30, 2011

(86) PCT No.: PCT/JP2011/057995
§ 371 (c)(1),
(2), (4) Date: Sep. 27, 2012

(87) PCT Pub. No.: WO2011/122657
PCT Pub. Date: Oct. 6, 2011

(65) Prior Publication Data
US 2013/0017451 A1 Jan. 17, 2013

(30) Foreign Application Priority Data

Mar. 30, 2010 (JP) ................................. 2010-078769

(51) Int. Cl.
*H01M 2/14* (2006.01)
*H01M 2/16* (2006.01)
(Continued)

(52) U.S. Cl.
CPC .............. *H01M 2/162* (2013.01); *D01D 5/30* (2013.01); *D01F 8/06* (2013.01); *D04H 1/541* (2013.01); *H01M 2/145* (2013.01); *Y10T 428/2931* (2015.01)

(58) Field of Classification Search
CPC ............ D01D 5/30; D01F 8/06; D04H 1/541; Y10T 428/2931; H01M 2/145; H01M 2/162
USPC ............................. 429/249; 442/199, 200, 201
See application file for complete search history.

(56) References Cited

U.S. PATENT DOCUMENTS 6,410,139 B1 6/2002 Tsutsui et al.
6,461,729 B1 * 10/2002 Dugan .......................... 428/373
(Continued)

FOREIGN PATENT DOCUMENTS

CN 101553511 10/2009
JP 6-063129 8/1994
(Continued)

OTHER PUBLICATIONS

Office Action issued in corresponding Taiwanese Application No. 100110891, Dec. 8, 2015, 8 pages.
(Continued)

*Primary Examiner* — Sean P Cullen
(74) *Attorney, Agent, or Firm* — Hamre, Schumnn, Mueller & Larson, P.C.

(57) ABSTRACT

A polyolefin-based split-type conjugate fiber according to the present invention is a polyolefin-based split-type conjugate fiber obtained by composite spinning including a first component containing a polypropylene-based resin and a second component containing a polyolefin-based resin, wherein the first component contains, as a primary component, a polypropylene resin having a Q value (the ratio between the weight average molecular weight Mw and the number average molecular weight Mn) of 6 or greater and a melt flow rate according to JIS K 7210 (MFR at a measurement temperature of 230° C. under a load of 2.16 kgf (21.18 N)) of 5 g/10 min or greater and less than 23 g/10 min, and the first component and the second component are adjacent to each other in a cross section of the polyolefin-based split-type conjugate fiber. Also, the polyolefin-based split-type conjugate fiber of the present invention can be obtained by melt spinning the first component and the second component by using a split type conjugate nozzle and drawing the resulting fiber.

12 Claims, 2 Drawing Sheets

(51) Int. Cl.
*H01M 2/18* (2006.01)
*D01D 5/30* (2006.01)
*D01F 8/06* (2006.01)
*D04H 1/541* (2012.01)

(56) References Cited

U.S. PATENT DOCUMENTS

| | | | |
|---|---|---|---|
| 2003/0039832 | A1 | 2/2003 | Tsutsui et al. |
| 2009/0105418 | A1* | 4/2009 | Dharmarajan et al. ......... 525/95 |
| 2010/0003515 | A1 | 1/2010 | Tanaka et al. |

FOREIGN PATENT DOCUMENTS

| | | |
|---|---|---|
| JP | 6-063130 | 8/1994 |
| JP | 8-311717 | 11/1996 |
| JP | 8-311718 | 11/1996 |
| JP | 2000-192335 | 7/2000 |
| JP | 2000-328367 | 11/2000 |
| JP | 2001-011764 | 1/2001 |
| JP | 2001-032138 | 2/2001 |
| JP | 2001-049529 | 2/2001 |
| JP | 2001-123331 | 5/2001 |
| JP | 2001-192936 | 7/2001 |
| JP | 2001-279531 | 10/2001 |
| JP | 2002-220740 | 8/2002 |
| WO | 2008/123333 | 10/2008 |

OTHER PUBLICATIONS

Extended European Search Report issued in corresponding European Application No. 11762881.8, Feb. 1, 2016, 8 pages.

* cited by examiner

A

B

POLYOLEFIN-BASED SPLIT-TYPE CONJUGATE FIBER, FIBER ASSEMBLY AND BATTERY SEPARATOR USING THE SAME AND METHOD FOR PRODUCING THE SAME

TECHNICAL FIELD

The present invention relates to a polyolefin-based split-type conjugate fiber, a fiber assembly and a battery separator that use the polyolefin-based split-type conjugate fiber, and a method for producing the polyolefin-based split-type conjugate fiber. More particularly, the invention relates to a polyolefin-based split-type conjugate fiber including a first component containing a polypropylene-based resin and a second component containing a polyolefin-based resin, a fiber assembly and a battery separator that use the polyolefin-based split-type conjugate fiber, and a method for producing the polyolefin-based split-type conjugate fiber.

BACKGROUND ART

With split-type conjugate fibers composed of a combination of the same homologous series of resins such as polyolefin-based resins, inherently, the resin components are likely to be strongly bonded to each other at the interface due to the combined resins being highly compatible. Accordingly, such split-type conjugate fibers have lower splittability than those composed of a combination of incompatible polymers such as, for example, a split-type conjugate fiber composed of a combination of a polyester based resin and a polyolefin-based resin and a split-type conjugate fiber composed of a combination of a polyester-based resin and a polyamide-based resin. Accordingly, various attempts are made to improve the splittability of split-type conjugate fibers composed of a combination of polyolefin-based resins. For example, Patent Document 1 discloses a polyolefin-based split-type conjugate fiber composed of polyolefin-based resins having a Rockwell hardness of 60 or greater. Patent Document 2 discloses a polyolefin-based split-type conjugate fiber in which at least one component is blended with a hydrophilic component. Patent Document 3 discloses a polyolefin-based split-type conjugate fiber that is composed of different polyolefin-based resins and in which a component containing a (meth)acrylic acid metal salt and a component that does not contain a (meth)acrylic acid metal salt are adjacent to each other in a cross section of the fiber in order to enhance splittability. Patent Document 4 discloses a polyolefin-based split-type conjugate fiber in which the hollow ratio is 5 to 40%, the ratio between the average external circumferential arc length W of the fiber made of one component and the average thickness L from the hollow portion to the external circumferential portion of the fiber is 0.25 to 2.5, and the melt flow rate (MFR rate) of the two components is defined. Patent Document 5 discloses a polyolefin-based split-type conjugate fiber having a cross section that is formed into a specific flat shape by an external stress.

Patent Documents 1 to 5 mentioned above propose various combinations of polyolefin-based resins such as, for example, a combination of polypropylene (PP) and polyethylene (PE), a combination of polypropylene (PP) and ethylene-propylene copolymer (EP), and a combination of polyethylene and ethylene-propylene copolymer. However, polyolefin-based split-type conjugate fibers composed of a combination of polyolefin-based resins with good splittability and a fineness for use in applications that require fibers having an even smaller fineness and a high level of splittability such as, for example, various types of wiping fiber assemblies such as personal and/or objective wipers, fiber assemblies for battery separators for use in various types of secondary batteries such as lithium ion batteries and nickel-metal hydride batteries, and fiber assemblies for filtration layers for use in various types of filters such as cartridge filters and laminate filters, have not yet been obtained.

CITATION LIST

Patent Document

Patent Document 1: JP H6 (1994)-63129 B
Patent Document 2: JP H8 (1996)-311717 A
Patent Document 3: JP 2001-49529 A
Patent Document 4: JP 2000-328367 A
Patent Document 5: JP 2001-32138 A

DISCLOSURE OF INVENTION

Problem to be Solved by the Invention

In order to solve the problems encountered with the conventional techniques, the present invention provides a polyolefin-based split-type conjugate fiber having excellent extensibility and splittability, a fiber assembly and a battery separator that use the polyolefin-based split-type conjugate fiber, and a method for producing the polyolefin-based split-type conjugate fiber.

Means for Solving Problem

A polyolefin-based split-type conjugate fiber according to the present invention is a polyolefin-based split-type conjugate fiber obtained by composite spinning including a first component containing a polypropylene-based resin and a second component containing a polyolefin-based resin, wherein the first component contains, as a primary component, a polypropylene resin having a Q value (ratio between weight average molecular weight Mw and number average molecular weight Mn) of 6 or greater and a melt flow rate according to JIS K 7210 (MFR at a measurement temperature of 230° C. under a load of 2.16 kgf (21.18 N)) of 5 g/10 min or greater and less than 23 g/10 min, and in a cross section of the polyolefin-based split-type conjugate fiber, the first component and the second component are adjacent to each other.

A method for producing a polyolefin-based split-type conjugate fiber according to the present invention is a method for producing a polyolefin-based split-type conjugate fiber including: a step of melt spinning a first component containing a polypropylene-based resin and a second component containing a polyolefin-based resin by using a split type conjugate nozzle to give an undrawn fiber bundle and drawing the obtained undrawn fiber bundle, wherein the first component contains, as a primary component, a polypropylene-based resin having a Q value before spinning (ratio between weight average molecular weight Mw and number average molecular weight Mn) of 6 or greater and a melt flow rate before spinning according to JIS K 7210 (MFR, at a measurement temperature of 230° C. under a load of 2.16 kgf (21.18 N)) of 5 g/10 min or greater and less than 23 g/10 min.

A fiber assembly according to the present invention includes the above-described polyolefin-based split-type conjugate fiber of the present invention in an amount of 10 mass % or greater.

A battery separator according to the present invention includes the above-described polyolefin-based split-type conjugate fiber of the present invention in an amount of 10 mass % or greater.

Effects of the Invention

The present invention can provide a polyolefin-based split-type conjugate fiber having excellent extensibility and splittability by, in the polyolefin-based split-type conjugate fiber including a first component containing a polypropylene-based resin and a second component containing a polyolefin-based resin, inclusion of a polypropylene-based resin having a Q value (ratio between weight average molecular weight Mw and number average molecular weight Mn) of 6 or greater and a melt flow rate according to JIS K 7210 (MFR at a measurement temperature of 230° C. under a load of 2.16 kgf (21.18 N)) of 5 g/10 min or greater and less than 23 g/10 min in the first component as a primary component. A production method of the present invention can provide a polyolefin-based split-type conjugate fiber having excellent extensibility and splittability by melt spinning a first component and a second component with a split type conjugate nozzle using, as a primary component of the first component, a polypropylene-based resin having a Q value before spinning (the ratio between the weight average molecular weight Mw and the number average molecular weight Mn) of 6 or greater and a melt flow rate before spinning according to JIS K 7210 (MFR at a measurement temperature of 230° C. under a load of 2.16 kgf (21.18 N)) of 5 g/10 min or greater and less than 23 g/10 min. The present invention also can provide a battery separator having a high puncture strength by containing the above polyolefin-based split-type conjugate fiber in an amount of 10 mass % or greater.

DESCRIPTION OF THE INVENTION

Figure 1:
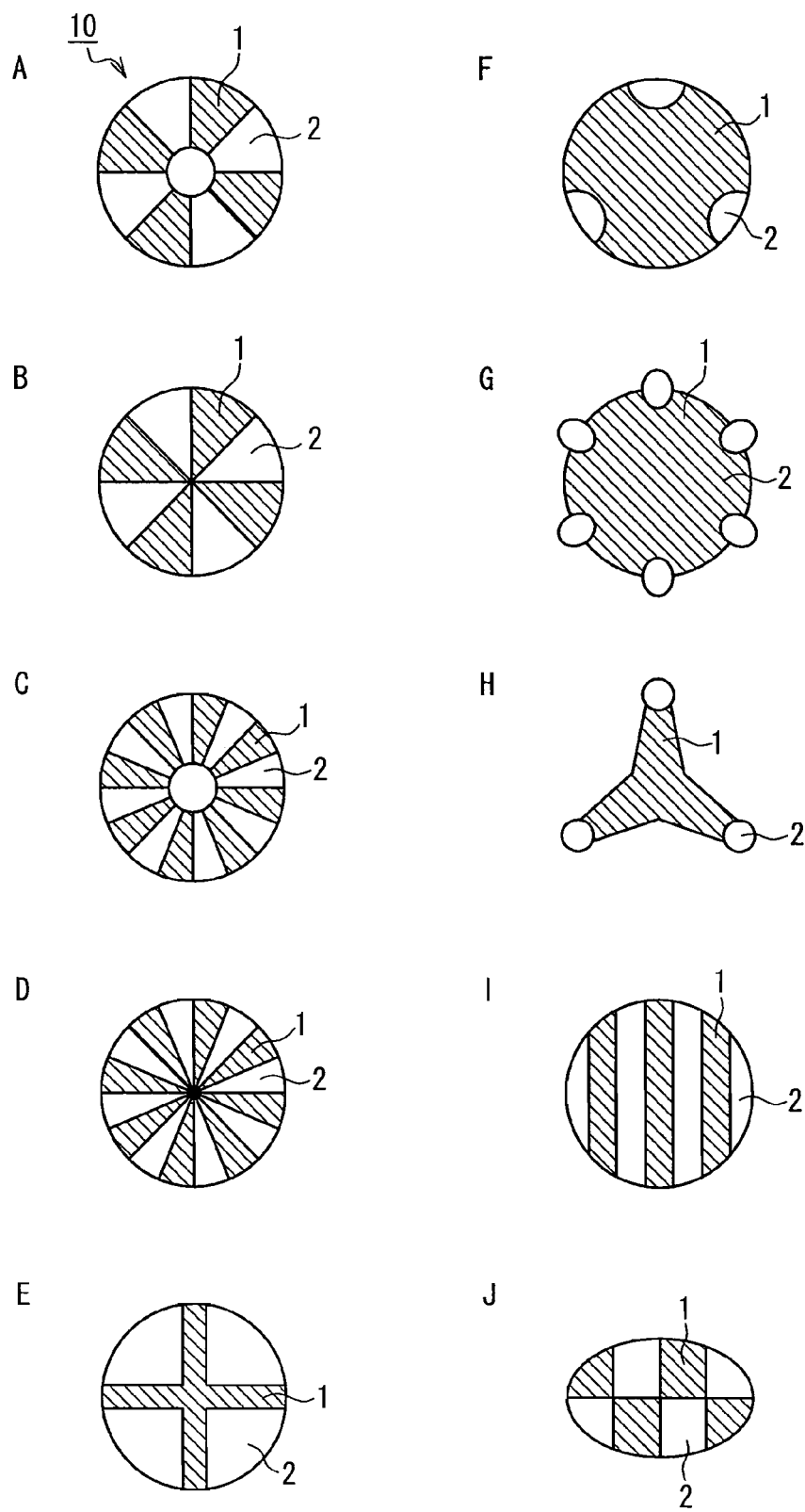
FIGS. 1A to 1J are schematic cross-sectional views showing cross sections of polyolefin-based split-type conjugate fibers.

In the case of a polyolefin-based split-type conjugate fiber composed of a combination of polyolefin-based resins, if an amorphous region remains in the resin components constituting the split-type conjugate fiber when the split-type conjugate fiber is subjected to a splitting treatment by physical impact such as stirring or application of a stream of high pressure water, the amorphous region acts as a cushion to absorb and attenuate the applied impact, so that the force applied to the interface of polyolefin-based resins is reduced, resulting in a low division ratio of the polyolefin-based split-type conjugate fiber.

With a polypropylene-based resin having a large Q value, which is the ratio between the weight average molecular weight Mw and the number average molecular weight Mn (hereinafter also referred to simply as a "Q value"), a large number of high molecular weight polypropylene molecules are present in the inside of the resin, and thus the width of the molecular weight distribution is large. On the other hand, with a polypropylene resin having a small Q value, the molecular chain length is made the same by cutting high molecular weight molecular chains produced by polymerization, and therefore the amount of the remaining high molecular weight polypropylene molecules is reduced, and thus the width of the molecular weight distribution is small When melt spinning a polypropylene-based resin, if a polypropylene-based resin whose molecular weight distribution has a small width, or in other words, a polypropylene-based resin having a small Q value is used, because a large number of amorphous regions (tie molecules) are present in the undrawn fiber bundle (undrawn tow), the amorphous regions tend to remain even after a drawing treatment. If, on the other hand, a polypropylene-based resin having a large width of molecular weight distribution in which a large number of high molecular weight polypropylene molecules are present, or in other words, a polypropylene-based resin having a large Q value is used, although such resin has spinnability lower than that of the resin having a small Q value, the high molecular weight polypropylene molecules tend to crystallize easily, and thus an undrawn fiber bundle having a high crystallinity is obtained, and by performing a drawing treatment at a high drawing ratio, it is possible to obtain a fiber having a small number of amorphous regions.

As can be seen from the foregoing, in a polyolefin-based split-type conjugate fiber that uses a polypropylene-based resin as one component, by using a polypropylene resin having a high Q value as the polypropylene-based resin, even if it is conjugated with a polyolefin-based resin, the resulting fiber can be easily split.

Also, it was found that in a polyolefin-based split-type conjugate fiber that uses a polypropylene-based resin as one component, the MFR of the polypropylene-based resin also affects the splittability of the polyolefin-based split-type conjugate fiber. It was found that in a polyolefin-based split-type conjugate fiber that uses a polypropylene-based resin as one component, if a polypropylene-based resin having a high MFR, or in other words a polypropylene resin having an even lower molecular weight is used as the polypropylene-based resin, the resin becomes less viscous and stretchable when melted, and thus the obtained undrawn fiber bundle has a high extensibility. If the MFR is high, however, bonding at the interface between the polypropylene-based resin component and the other component, namely, a polyolefin-based resin component tends to be strong, and thus the splittability by the action of a stream of high pressure water or by a mixing treatment in a papermaking process is likely to be reduced. Using a polypropylene resin having a low MFR, or in other words, a resin having a high molecular weight as a component of the polyolefin-based split-type conjugate fiber makes it possible to perform a drawing treatment at a high drawing ratio at a relatively high temperature of 120 to 150° C., and thus is preferable when conjugated with a polyolefin-based resin having a melting point higher than that of the polypropylene resin, such as a polymethyl pentene-based resin, to yield a polyolefin-based split-type conjugate fiber. However, if a resin having an extremely low MFR is used, the resulting fiber has low extensibility, and thus even if a drawing treatment is performed in a relatively high temperature range of 120 to 150° C., the fiber is hardly stretched, impairing the process performance, and thus it is unlikely to obtain a fiber having a small fineness. Accordingly, the polypropylene-based resin constituting the first component is required to have a low MFR as long as the process performance, particularly the extensibility is not impaired.

With respect to the split-type conjugate fiber obtained by conjugating polyolefin-based resins, the influence of the Q value and MFR of the polypropylene-based resin on the splittability and extensibility of the split-type conjugate fiber was examined based on the above, and as a result, the polyolefin-based split-type conjugate fiber of the present invention has been accomplished. Specifically, in the present invention, using a polypropylene resin having a Q value of 6 or greater and a melt flow rate according to JIS K 7210 (MFR at a measurement temperature of 230° C. under a load of 2.16 kgf (21.18 N)) of 5 g/10 min or greater and less than 23 g/10 min improves the extensibility of the split-type conjugate fiber in which polyolefin-based resins are conjugated, particularly, the extensibility during a drawing treatment at an even higher temperature and a high drawing ratio in which the crystallization of the fiber easily proceeds. Also, performing a drawing treatment at a high drawing ratio and a high temperature reduces the amorphous portions within the fiber. Also, as a result of using a polypropylene resin having a small MFR, bonding at the bonding interface between the conjugated polyolefin resin components is not strong and thus a high level of splittability can be maintained. Consequently, the polyolefin-based split-type conjugate fiber of the present invention can have both high extensibility and splittability.

(Polyolefin-Based Split-Type Conjugate Fiber)

As shown in FIGS. 1A to 1J and FIGS. 2A and 2B, polyolefin-based split-type conjugate fibers (hereinafter also referred to simply as split-type conjugate fibers) according to the present invention include a first component 1 and a second component 2. The first component 1 and the second component 2 are adjacent to each other in a cross section of the polyolefin-based split-type conjugate fibers.

<First Component>

The first component contains a polypropylene-based resin having a Q value of 6 or greater and a melt flow rate according to JIS K 7210 (MFR at a measurement temperature of 230° C. under a load of 2.16 kgf (21.18 N), hereinafter also referred to simply as MFR 230) of 5 g/10 min or greater and less than 23 g/10 min as a primary component (hereinafter referred to as a primary polypropylene-based resin). As used herein, "primary component" refers to a component contained in an amount of 50 mass % or greater with respect to the total amount of the first component. This applies to the following description.

In the first component, the amount of the primary polypropylene-based resin is preferably 80 mass % or greater, and it is particularly preferable that the first component is substantially composed of the primary polypropylene-based resin. As used herein, the term "substantially" is used, taking into consideration the fact that usually, resins provided as products contain additives such as a stabilizer, and various types of additives are added during production of fibers, or in other words, fibers that are composed only of the primary polypropylene-based resin and do not at all contain other components are unlikely to be obtained. Usually, the amount of various types of additives is 15 mass % at maximum. If the amount of the primary polypropylene-based resin in the first component is large, the splittability and extensibility of the polyolefin-based split-type of the present invention are improved further.

There is no particular limitation on the primary polypropylene-based resin, and a homopolymer, a random copolymer, a block copolymer, or mixtures thereof can be used. The random copolymer and the block copolymer can be, for example, a copolymer of propylene and at least one α-olefin selected from the group consisting of ethylene and α-olefins having 4 or more carbon atoms. Examples of the α-olefins having 4 or more carbon atoms include, but are not particularly limited to, 1-butene, 1-pentene, 3,3-dimethyl-1-butene, 4-methyl-1-pentene, 4,4-dimethyl-1-pentene, 1-decene, 1-dodecene, 1-tetradecene, 1-octadecene and the like. The amount of propylene in the copolymer is preferably 50 mass % or greater. Among the polypropylene-based resins listed above, it is particularly preferable to use a propylene homopolymer in view of process performance and cost efficiency (production cost). They may be used singly or in a combination of two or more.

The primary polypropylene-based resin has a Q value of 6 or greater, preferably 6 to 15, and more preferably 6 to 12. With the primary polypropylene-based resin having a Q value of 6 or greater, a polyolefin-based split-type conjugate fiber having excellent extensibility and splittability can be obtained. Also, the primary polypropylene-based resin has a Q value before spinning of 8 or greater, preferably 8 to 15, and more preferably 8 to 12. If the primary polypropylene-based resin has a Q value before spinning of 8 or greater, it is possible to obtain a polyolefin-based split-type conjugate fiber having excellent extensibility and splittability.

The primary polypropylene-based resin preferably has a z average molecular weight Mz of 800,000 or greater and a weight average molecular weight Mw of 800,000 or less. More preferably, the z average molecular weight Mz is 800,000 to 5,000,000, and the weight average molecular weight Mw is 100,000 to 800,000. A polypropylene-based resin having a z average molecular weight Mz of 800,000 or greater imparts rigidity to the first component due to a relatively large amount of high molecular weight polypropylene molecules being contained. The first component having excellent rigidity is unlikely to absorb impact from external force, and thus the applied external force efficiently acts as a force that splits the conjugate fiber into the first component and the second component, as a result of which splittability is improved. If the primary polypropylene-based resin has a average molecular weight Mz of 800,000 or greater and a weight average molecular weight Mw of 800,000 or less, due to the z average molecular weight Mz being 800,000 or greater, excellent splittability can be obtained, and due to the weight average molecular weight Mw being 800,000 or less, the resin have a good flowability, and thus the fiber can be spun without yarn breakage.

The primary polypropylene-based resin preferably has a z average molecular weight Mz of 800,000 to 5,000,000, and more preferably 1,000,000 to 4,000,000. If the z average molecular weight Mz is within the range of 800,000 to 5,000,000, due to the rigidity being high and the high molecular weight component that is likely to crystallize being contained, it is possible to obtain a fiber that is likely to crystallize when drawn and has excellent splittability. Also, the high molecular weight polymers have excellent rigidity, and it is therefore possible to obtain a split-type conjugate fiber and/or a ultrafine fiber having excellent rigidity. A fiber assembly using such a fiber has an excellent puncture strength. Also, the primary polypropylene-based resin preferably has a z average molecular weight Mz before spinning of 800,000 to 5,000,000, more preferably 1,000,000 to 4,500,000, and even more preferably 2,000,000 to 4,000,000. If the z average molecular weight Mz before spinning is 800,000 or greater, it is possible to easily obtain a polyolefin-based split-type conjugate fiber having a z average molecular weight Mz after spinning that satisfies the above range.

Also, a split-type conjugate fiber containing a polypropylene-based resin having a z average molecular weight Mz of 800,000 or greater contains high molecular weight polypropylene molecules, the split-type conjugate fiber tends to easily crystallize during the spinning process and thus has a high crystallinity at the stage of being an undrawn fiber bundle. Then, subjecting it to a drawing treatment yields a fiber having less amorphous regions. Fibers having a high crystallinity and less amorphous regions have improved splittability because, due to a small number of amorphous regions that absorb and attenuate the impact applied during splitting treatment by physical impact, the force applied to the bonding interface is delivered to the first component and the second component without being attenuated.

The primary polypropylene-based resin preferably has a weight average molecular weight Mw of 100,000 to 800,000, and more preferably 200,000 to 500,000. If the weight average molecular weight Mw is within the range of 100,000 to 800,000, the flowability of the resin becomes high, and it is therefore possible to obtain a split-type conjugate fiber that is unlikely to undergo yarn breakage and is easily spun. The primary polypropylene-based resin preferably has a weight average molecular weight Mw before spinning of 100,000 to 800,000, and more preferably 200,000 to 700,000. If the weight average molecular weight Mw before spinning is 100,000 or greater, it is possible to easily obtain a polyolefin-based split-type conjugate fiber having a weight average molecular weight Mw after spinning that satisfies the above range.

In the case where a polypropylene-based resin having a z average molecular weight Mz of 800,000 or greater is used as the polypropylene-based resin, due to a relatively large amount of high molecular weight polypropylene molecules being contained, the resin may have a low flowability and be difficult to spin. Accordingly, it is more preferable to use a polypropylene-based resin having a weight average molecular weight Mw of 800,000 or less. A polypropylene-based resin having a weight average molecular weight Mw of 800,000 or less has a relatively small melt viscosity and excellent flowability, and thus the fiber can be spun without yarn breakage.

The primary polypropylene-based resin preferably has a number average molecular weight Mn of 10,000 to 80,000, and more preferably 20,000 to 60,000. If the number average molecular weight Mn is within the range of 10,000 to 80,000, the number of amorphous regions tends to be small, and the action that absorbs and attenuates impact when an external force or the like is applied to the resin can be suppressed, which easily generates a repulsive force at the bonding interface in the split-type conjugate fiber, as a result of which a split-type conjugate fiber having excellent splittability can be obtained. The primary polypropylene-based resin preferably has a number average molecular weight Mn before spinning of 10,000 to 80,000, and more preferably 20,000 to 70,000. If the number average molecular weight Mn before spinning is 10,000 or greater, it is possible to obtain easily a polyolefin-based split-type conjugate fiber having a number average molecular weight Mn after spinning that satisfies the above range.

The Q value, the number average molecular weight Mn, the weight average molecular weight Mw and the z average molecular weight Mz of the primary polypropylene-based resin may be different before and after spinning. In particular, a polypropylene-based resin having a Q value before spinning of 8 or greater may have a Q value of 6 or greater after spinning. This is presumably because the intermolecular bonds constituting relatively high molecular weight polypropylene molecules are broken by heat during spinning or a part of relatively high molecular weight polypropylene molecules undergoes chain transfer to low molecular weight polypropylene molecules. In the present invention, the Q value and the Mn, Mw and Mz values are values after spinning unless it is clearly specified that they are values before spinning.

The primary polypropylene-based resin preferably has a tensile modulus measured according to JIS K 7161 of 1700 MPa or greater, more preferably 1900 MPa or greater, and particularly preferably 2000 MPa or greater. If the primary polypropylene-based resin has a tensile modulus of 1700 MPa or greater, yarn breakage due to drawing is unlikely to occur even when a drawing treatment is performed under conditions of a high temperature and a high drawing ratio. Accordingly, a split-type conjugate fiber having an even smaller fineness is likely to be obtained, and also the splittability during splitting treatment is not reduced even when the fiber is drawn at a high drawing ratio, as a result of which a fiber or fiber assembly whose components are sufficiently split is likely to be easily obtained. There is no particular limitation on the upper limit of the tensile modulus of the primary polypropylene resin, but the tensile modulus of the primary polypropylene resin is preferably 2700 MPa or less, and particularly preferably 2500 MPa or less. If the tensile modulus is 2700 MPa or less, the tensile modulus of the polypropylene-based resin does not become too high, and therefore the split-type conjugate fiber can be drawn sufficiently by a drawing treatment without reducing extensibility, and the occurrence of yarn breakage when drawn is reduced.

The primary polypropylene-based resin may have an MFR 230 before spinning of 5 g/10 min or greater and less than 23 g/10 min, and it is more preferable that the MFR 230 before spinning is 8 g/10 min or greater and 16 g/10 min or less. If the MFR 230 before spinning is 5 g/10 min or greater, yarn breakage is unlikely to occur during spinning.

It is particularly preferable that the primary polypropylene-based resin has a Q value before spinning of 9 or greater, an MFR 230 before spinning of 16 g/10 min or less, and a tensile modulus before spinning of 2000 MPa or greater. If the Q value, the MFR 230 and the tensile modulus of the primary polypropylene-based resin satisfy the respective ranges mentioned above, the polyolefin-based split-type conjugate fiber obtained by composite spinning the polyolefin-based resin and the polypropylene-based resin has high extensibility and splittability, and thus a ultrafine fiber can be obtained easily from the split-type conjugate fiber, as a result of which it is possible to easily obtain a fiber assembly having a high ultrafine fiber content and a low content of split-type conjugate fiber that has been unsplit.

The first component may contain other polypropylene-based resins in addition to the primary polypropylene-based resin as long as the effects of the present invention are not impaired. Examples of other polypropylene-based resins include, but are not particularly limited to, a homopolymer, a random copolymer, a block copolymer and mixtures thereof. The random copolymer and the block copolymer can be, for example, a copolymer of propylene and at least one α-olefin selected from the group consisting of ethylene and α-olefins having 4 or more carbon atoms. Examples of the α-olefins having 4 or more carbon atoms include, but are not particularly limited to, 1-butene, 1-pentene, 3,3-dimethyl-1-butene, 4-methyl-1-pentene, 4,4-dimethyl-1-pentene, 1-decene, 1-dodecene, 1-tetradecene, 1-octadecene and the like. The amount of propylene in the copolymer is preferably 50 mass % or greater. Among the polypropylene-based resins listed above, it is particularly preferable to use a propylene homopolymer in view of process performance and cost efficiency (production cost).

The first component further may contain a known split accelerator as long as the extensibility and splittability of the split-type conjugate fiber of the present invention are not lost. Examples of known split accelerators that can be used include a silicon compound-based split accelerator, an unsaturated carboxylic acid-based split accelerator, a split accelerator made of a (meth) acrylic acid-based compound, and the like. Among them, it is preferable to use a split accelerator made of a (meth) acrylic acid-based compound, and it is more preferable to use a (meth) acrylic acid metal salt. In the case where a (meth) acrylic acid metal salt is added to the first component as the split accelerator, the (meth) acrylic acid metal salt may be added in an amount of 1 to 10 mass % with respect to the total amount of the first component.

<Second Component>

The second component contains a polyolefin-based resin. The second component preferably contains a polyolefin-based resin in an amount of 50 mass % or greater, and more preferably in an amount of 80 mass % or greater. It is particularly preferable that the second component is substantially composed of a polyolefin-based resin. Usually, a polyolefin-based resin has good compatibility with a polypropylene-based resin, and a split-type conjugate fiber composed of a combination of these resins generally has low splittability. In the present invention, however, excellent splittability can be obtained by combining the primary polypropylene-based resin and a polyolefin-based resin. Polyolefin-based resins are suitable as a resin for constituting battery separators because of their excellent stability to electrolytes. If the second component contains a polyolefin-based resin in an amount of 80 mass % or greater, it is possible to obtain a battery separator that does not easily undergo degradation over a long period of time even in an electrolyte that is an aqueous alkaline solution.

Examples of the polyolefin-based resin include, but are not particularly limited to, polyethylene, polypropylene, polybutene, polymethyl pentene, ethylene vinyl alcohol copolymer, ethylene vinyl acetate copolymer, ethylene acrylic acid copolymer, ethylene acrylic acid methyl copolymer, ethylene maleic acid copolymer, ethylene maleic anhydride copolymer, ethylene propylene copolymer and the like. They may be used singly or in a combination of two or more. These polyolefin-based resins preferably are used in battery separators because they have excellent resistance to chemicals.

The polyolefin-based resin contained in the second component is preferably polymethyl pentene-based resin from the viewpoint of further excellent splittability, resistance to chemicals and the like. Examples of the polymethyl pentene resin include a copolymer containing 4-methylpentene-1 in an amount of 85 mol % or more, and a copolymer of for example, 4-methylpentene-1 and one or two kinds of α-olefins having 2 to 20 carbon atoms, preferably 8 to 18 carbon atoms such as ethylene, propylene, butene-1, hexene-1, octene-1, decane-1, tetradecane-1 and octadecane-1. The polymethyl pentene-based resins may be used singly or in a combination of two or more.

Polymethyl pentene has excellent resistance to chemicals and water vapor and a low density, like other polyolefin-based resins. In addition to these features, polymethyl pentene has excellent heat resistance, strippability, gas permeability and light transmitting properties, and therefore is regarded as a thermoplastic resin that is expected to be useful in a wide range of applications. However, generally, in the case where polymethyl pentene is used as a component for a split-type conjugate fiber, it is difficult to obtain a split-type conjugate fiber because polymethyl pentene is difficult to spin and stretch. In the present invention, even with the polymethyl pentene-based resin that is generally regarded as difficult to spin and stretch by combining it with the primary polypropylene-based resin, it is possible to obtain a split-type conjugate fiber that can be easily spun and has good extensibility.

The polymethyl pentene-based resin preferably has a melting point of 210 to 245° C. and a melt flow rate according to ASTM D 1238 (MFR at a measurement temperature of 260° C. under a load of 5.0 kgf (49.0 N), hereinafter also referred to as MFR 260) of 120 to 280 g/10 min. If the polymethyl pentene-based resin has a melting point of 210 to 245° C., the resulting fiber can be spun easily and has excellent extensibility. If the polymethyl pentene-based resin has an MFR 260 of 120 to 280 g/10 min, the resulting fiber can be easily spun.

The polymethyl pentene-based resin preferably has an MFR 260 of 140 to 260 g/10 min, more preferably 160 to 260 g/10 min, and particularly preferably 170 to 250 g/10 min. Using a polymethyl pentene-based resin that satisfies the above MFR range yields a polyolefin-based split-type conjugate fiber having excellent extensibility and splittability. If the polymethyl pentene-based resin has an MFR 260 of 120 g/10 min or greater, the polymethyl pentene-based resin has improved extensibility and can be drawn during drawing treatment, and the occurrence of yarn breakage during drawing treatment is reduced. It on the other hand, the polymethyl pentene-based resin has an MFR 260 of 280 g/10 min or less, a polyolefin-based split-type conjugate fiber having excellent extensibility can be obtained, and the bonding interface between the polymethyl pentene and the polypropylene-based resin is not so strong, so that the polyolefin-based split-type conjugate fiber can be split easily. Also, there is no possibility of reduction of splittability.

The polymethyl pentene-based resin preferably has a tensile modulus measured according to JIS K 7161 of 1500 MPa or greater, more preferably 1600 MPa or greater, and particularly preferably 1700 MPa or greater. Using a polymethyl pentene-based resin that satisfies the above tensile modulus range yields a polyolefin-based split-type conjugate fiber having excellent extensibility and splittability. If the polymethyl pentene-based resin has a tensile modulus of 1500 MPa or greater, the splittability is not reduced, and a fiber or fiber assembly whose components are sufficiently split is likely to be easily obtained. There is no particular limitation on the upper limit of the tensile modulus of the polymethyl pentene-based resin, but the tensile modulus of the polymethyl pentene-based resin is preferably 2700 MPa or less, and particularly preferably 2500 MPa or less. If the tensile modulus is 2700 MPa or less, the tensile modulus of the polymethyl pentene-based resin does not become too high, and therefore the split-type conjugate fiber can be sufficiently drawn by a drawing treatment without reducing extensibility, and the occurrence of yarn breakage when drawn is reduced.

From the viewpoint of obtaining a split-type conjugate fiber having excellent thermal adhesion, the polyolefin-based resin contained in the second component is preferably polyethylene or an ethylene copolymer composed of ethylene and vinyl acetate, acrylic acid, acrylic acid methyl, maleic acid, maleic anhydride or a vinyl alcohol component. In particular, from the viewpoint of obtaining a split-type conjugate fiber having excellent resistance to chemicals, it is preferable to use a polyethylene or ethylene vinyl alcohol copolymer. If the polyolefin-based resin is an ethylene or ethylene copolymer, the fibers can be softened and bonded to each other by application of heat, and therefore a fiber assembly having an excellent tensile strength and puncture strength can be obtained.

The second component is preferably a core sheath type conjugate segment in which a polyolefin-based resin is the sheath component. With this configuration, by splitting the polyolefin-based split-type conjugate fiber, a core sheath type ultrafine fiber derived from the second component is formed. Then, by melting only the polyolefin-based resin serving as the sheath component of the core sheath type conjugate ultrafine fiber, ultrafine fibers formed by the split-type conjugate fiber being split can be bonded thermally to each other, and thus a fiber assembly having an excellent puncture strength and tensile strength can be obtained.

In the case where the second component constitutes a core sheath type conjugate segment, the core component is preferably the same resin as the primary polypropylene resin in the first component. With this configuration, the split-type conjugate fiber is composed of two resin components, which makes the nozzle design and the composite spinning easier. Also, due to the fact that the second component also contains the primary polypropylene resin that has a function of improving puncture strength, when the polyolefin-based split-type conjugate fiber is used to make a non-woven fabric, a non-woven fabric having a further improved puncture strength can be obtained. The core component may be another polyolefin-based resin that is different from the primary polypropylene resin. In this case, the core component may be one or a combination of two or more of the polyolefin-based resins listed above.

In the case where the second component constitutes a core sheath type conjugate segment, there is no particular limitation on the cross-sectional shape of the core component of the second component. The core component may have, for example, an elliptic cross-sectional shape or a perfect circular cross-sectional shape. The core component may be located at the center of the second component or may be located off-center rather than in the center.

In the case where the second component constitutes a core sheath type conjugate segment, the polyolefin-based resin constituting the sheath component in the second component preferably has a melting point lower than that of the resin component constituting the core component. In this case, the melting point of the sheath component is lower than that of the core component preferably by 10° C. or more, and more preferably 20° C. or more. Alternatively, the melting point of the resin component constituting the sheath component may be higher than that of the resin component constituting the core component. For example, as will be described later, the sheath component may be constituted by an ethylene vinyl alcohol copolymer (having a melting point of about 171° C.) and the core component may be constituted by a polypropylene (having a melting point of about 165° C.). The sheath component may be constituted by a resin component that is more easily softened by heat or the like, as compared to the resin component constituting the core component.

If the sheath component of the second component is a polyethylene, a core sheath type conjugate ultrafine fiber derived from the second component exhibits good thermal adhesion, and the strength of the fiber assembly after thermal bonding becomes high, and therefore a fiber assembly having an excellent tensile strength and puncture strength can be obtained. Also, if the sheath component of the second component is a polyethylene, a fiber assembly suitable for a hydrophilization treatment such as sulfonation can be obtained.

If the sheath component of the second component is an ethylene vinyl alcohol copolymer, the ethylene vinyl alcohol copolymer can function as a thermally bonding component. The ethylene vinyl alcohol copolymer is hydrophilic and imparts high electrolyte retention to the fiber assembly, and is therefore preferably used as a resin for constituting a battery separator. The ethylene vinyl alcohol copolymer is gelled when heated in a high humidity condition and provides thermal adhesion at a temperature lower than the melting point. Accordingly, in the case where an ethylene vinyl alcohol copolymer is used as a thermally bonding component, fibers may be thermally bonded to each other by a heat moisture treatment. Also, the split-type conjugate fiber having the configuration in which a polypropylene and an ethylene vinyl alcohol copolymer are adjacent to each other preferably is used because it has a high level of splittability.

The number of divisions of the split-type conjugate fiber of the present invention (or in other words, the total number of segments) can be determined according to the fineness of the split-type conjugate fiber and the fineness of the ultrafine fiber. The number of divisions of the split-type conjugate fiber is preferably, for example, 4 to 30, more preferably 6 to 24, and even more preferably 8 to 20. The splittability is likely to improve as the number of divisions of the split-type conjugate fiber is reduced, but it tends to be difficult to obtain a fiber having a small fineness if the number of interfaces between the first component and the second component is too small. Furthermore, if the number of divisions is too small, it may be necessary to reduce the fineness of the split-type conjugate fiber in order to obtain a ultrafine fiber having a predetermined fineness, which may impair the production efficiency of the fiber or make spinning difficult. If the number of divisions is too large, the number of interfaces between the first component and the second component increases, and thus it tends to be easy to obtain a fiber having a small fineness.

Figure 2:
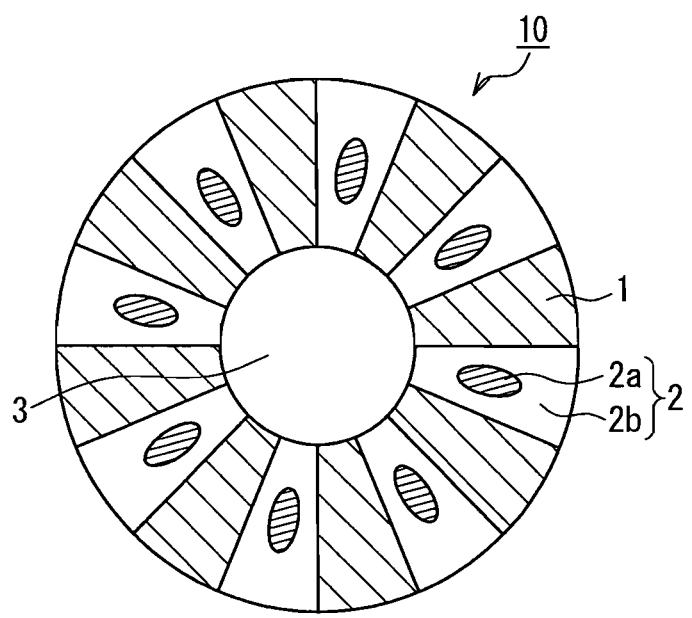
FIGS. 2A and 2B are schematic cross-sectional views showing examples of polyolefin-based split-type conjugate fibers whose second component constitutes a core sheath type conjugate segment.
Figure 2:
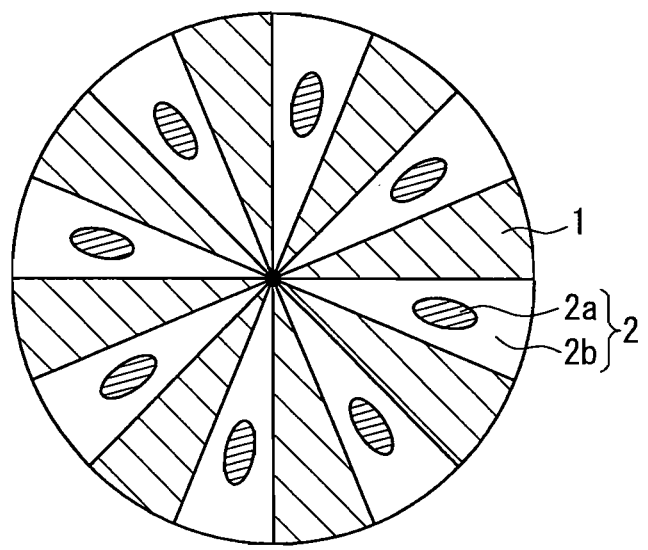

As shown in FIGS. 1A, 1C and 2A, the split-type conjugate fiber preferably has a hollow portion in a center portion of the fiber cross section. As used herein, the center portion of the fiber cross section refers to an area approximately near the center of a cross section of the fiber. The hollow portion may be located off-center rather than in the center (rather than concentrically located) as long as there is a hollow in the center portion, but in terms of production efficiency, the hollow portion is preferably concentrically located. Also, the hollow portion may have any shape such as a circle, an ellipse or an irregular shape. The presence of a hollow portion as described above reduces the contact area between the first component and the second component and improves splittability as compared to that of a split-type conjugate fiber having a solid cross section in which there is no hollow portion in the center portion of the fiber. Thus a high level of splittability can be attained even with a small impact such as hydroentanglement at a low water pressure, defibration and refining at the time of slurry preparation in a wet papermaking method, or the like. With the configuration having a hollow portion in the center portion of the fiber, the tensile strength and puncture strength of the fiber assembly can be further increased as compared to the split-type conjugate fiber that does not have a hollow portion in the center portion of the fiber. This is probably because the ultrafine fiber formed by the split-type conjugate fiber having a hollow portion in the center portion of the fiber being split has a fiber cross section having a shape closer to a circle. With this configuration, it is also possible to suppress yarn breakage during spinning of the split-type conjugate fiber.

In the case where the split-type conjugate fiber has a hollow portion, the hollow ratio may be determined according to the division ratio and the cross-sectional shape of the ultrafine fiber. The hollow ratio is the ratio of area of hollow portions in a cross section of the fiber. For example, the hollow ratio is preferably about 1 to 50%, and preferably about 5 to 40%. More specifically, in the case where the number of divisions is 6 to 10, the hollow ratio is preferably 5 to 20%. In the case where the number of divisions is 12 to 20, the hollow ratio is preferably 15 to 40%. If the hollow ratio is too small, it is difficult to obtain significantly the effects obtained by provision of the hollow portion. If the hollow ratio is too large, there is a possibility that in the drawing or opening process of the split-type conjugate fiber, the split-type conjugate fiber might be split, and ease of handling might be compromised.

The conjugate ratio (volume ratio) between the first component and the second component is preferably 3:7 to 7:3 and particularly preferably 4:6 to 6:4 in terms of splittability of the fiber and process performance.

In the case where the second component constitutes a core sheath type conjugate segment, the fiber cross section is designed such that the volume ratio ([the first component+the core component of the second component]:[the sheath component of the second component]) is preferably 2:8 to 8:2, and more preferably 4:6 to 6:4. If the volume ratio of the two resin components is outside the range of 2:8 to 8:2, ease of spinning is reduced, and good splittability may not be obtained. For example, if the volume ratio ([the first component+the core component of the second component]:[the sheath component of the second component]) is 5:5, care should be taken to make sure that the volume of the first component is smaller than the total volume of the second component.

There is no particular limitation on the fineness before splitting of the split-type conjugate fiber, but the fineness is preferably within a range of 0.1 to 8 dtex, more preferably within a range of 0.6 to 6 dtex, and even more preferably within a range of 1 to 4 dtex. If attempts are made to set the fineness before splitting of the split-type conjugate fiber to less than 0.1 dtex, spinning becomes unstable, and there is a possibility that the production efficiency of the fiber as well as the fiber assembly might be reduced. Similarly, if the fineness before splitting of the split-type conjugate fiber exceeds 8 dtex, spinning may also become unstable.

(Ultrafine Fiber)

The split-type conjugate fiber is split into a ultrafine fiber A derived from the first component and a ultrafine fiber B derived from the second component. In other words, the respective components constituting the split-type conjugate fiber form independent ultrafine fibers as a result of the split-type conjugate fiber being split.

The ultrafine fiber A and/or the ultrafine fiber B preferably have/has a cross-sectional shape that satisfies $1 \leq L/D \leq 2$, where in a cross section of the fiber, the longest of the line segments joining any two points on the external circumferential (the contour of the cross section of the fiber) is defined as L, and the diameter of a circle having an area equal to the cross-sectional area of the ultrafine fiber is defined as D. If the ultrafine fiber A has a cross-sectional shape that satisfies $1 \leq L/D \leq 2$, due to the cross-sectional shape becoming a shape closer to a circle, the puncture strength of the fiber assembly is increased as compared to that of the ultrafine fibers having a flat cross-sectional shape.

From the viewpoint of obtaining a fiber assembly having a particularly excellent puncture strength, it is more preferable that the ultrafine fiber A has a cross-sectional shape that satisfies $1 \leq L/D \leq 1.8$, and it is even more preferable that the ultrafine fiber A has a cross-sectional shape that satisfies an L/D of 1.6 or less. It is more preferable that the ultrafine fiber B has a cross-sectional shape that satisfies $1 \leq L/D \leq 1.4$, and it is even more preferable that the ultrafine fiber B has a cross-sectional shape that satisfies an L/D of 1.2 or less.

The ultrafine fibers having a cross-sectional shape as described above can be obtained by, for example, adjusting the structure of the cross section of the split-type conjugate fiber to a cross-sectional structure in which respective components are alternately arranged in a radial manner. Furthermore, by making the split-type conjugate fiber so as to have a cross-sectional structure having a hollow portion in the center portion of the fiber, ultrafine fibers having a specific cross sectional shape as described above can be easily obtained.

The ultrafine fiber A and/or the ultrafine fiber B have/has a fineness of less than 0.6 dtex, and more preferably less than 0.4 dtex. If the ultrafine fiber has a fineness of less than 0.6 dtex, a thin fiber assembly can be obtained easily. The ultrafine fiber A and the ultrafine fiber B may have a different fineness, with their lower fineness limit being preferably 0.006 dtex.

Particularly when the ultrafine fiber B is of a core sheath type, the ultrafine fiber B preferably has a fineness of less than 0.4 dtex. In the case where a core sheath type conjugate fiber is contained in a fiber assembly, the surface area of the core sheath type conjugate fiber increases as the fineness of the core sheath type conjugate fiber decreases, and therefore the thermally bonded area is increased and the mechanical strength of the fiber assembly after thermal adhesion is increased. Accordingly, in the case where the ultrafine fiber B is a core sheath type conjugate ultrafine fiber, the fineness is preferably set to be smaller.

(Method for Producing Polyolefin-Based Split-Type Conjugate Fiber)

A method for producing a polyolefin-based split-type conjugate fiber according to the present invention will be described next. The split-type conjugate fiber can be obtained by, for example, melt spinning a first component containing a polypropylene-based resin and a second component containing a polyolefin-based resin by using a split type conjugate nozzle to yield an undrawn fiber bundle and drawing the obtained undrawn fiber bundle.

Specifically, first, a split type conjugate nozzle that can produce a fiber having a predetermined cross section is attached to a melt spinning machine. Then, a polypropylene-based resin constituting the first component and a polyolefin-based resin constituting the second component are extruded and melt spun at a spinning temperature of 200 to 360° C. such that the fiber cross section has a structure in which the first component and the second component are located adjacent to each other but are split from each other, whereby an undrawn fiber bundle (spun filament), or in other words, an undrawn polyolefin-based split-type conjugate fiber is obtained. The split-type conjugate fiber contains a polypropylene-based resin having a large Q value and a low MFR 230 as the primary component of the first component, and therefore the first component is preferably melt at a higher temperature and melt spun. For example, the spinning temperature of the first component is preferably 250 to 360° C., more preferably 280 to 360° C., even more preferably 300 to 350° C., and particularly preferably 320 to 350° C. There is no particular limitation on the spinning temperature of the second component containing a polyolefin-based resin as long as a reduction of spinnability and a collapse of the cross-sectional shape of the cross section of the split-type conjugate fiber do not occur. The spinning temperature of the second component is preferably, for example, 245 to 350° C., and more preferably 250 to 330° C.

The obtained undrawn fiber bundle (spun filament) preferably has a fineness of 1 to 30 dtex. If the spun filament has a fineness of less than 1 dtex, yarn breakage tends to occur frequently during spinning. If, on the other hand, the spun filament has a fineness exceeding 30 dtex, a high degree of drawing is required or the fineness after splitting is increased, as a result of which it tends to be difficult to obtain ultrafine fibers. In the case of improving splittability by drawing the spun filament to a high degree, the spun filament preferably has a fineness of 4 to 15 dtex, more preferably 6 to 12 dtex, even more preferably 8 to 12 dtex, and particularly preferably 9 to 11 dtex.

Next, the obtained undrawn fiber bundle (spun filament) is subjected to drawing treatment, whereby a drawn filament is obtained. The drawing treatment is preferably carried out by setting the drawing temperature to a temperature within a range of 40 to 150° C. The drawing treatment is preferably performed at a temperature lower than or equal to the melting point of the resin having the lowest melting point among the resin components constituting the split-type conjugate fiber. Also, drawing is performed at a drawing ratio that is 60 to 100% of the maximum drawing ratio such that the crystallization of the fiber easily proceeds and a polyolefin-based split-type conjugate fiber having a sufficiently small fineness is obtained. Specifically, the drawing ratio is preferably 1.1 times or greater, more preferably 1.5 times or greater, and even more preferably 2 to 8 times. If the drawing ratio is 1.1 times or greater, splittability is improved due to the molecules constituting the fiber being oriented in the lengthwise direction of the fiber. The drawing method can be either a wet drawing method that is carried out in warm water or hot water or a dry drawing method depending on the resin components used. For example, a known drawing treatment can be performed such as wet drawing in which drawing is performed by heating the fiber with a hot liquid such as hot water heated to a high temperature, dry drawing in which drawing is performed by heating the fiber in a high temperature gas or with a high temperature metal roll or the like, or water vapor drawing in which drawing is performed by heating the fiber in a state in which water vapor at a temperature of 100° C. or higher is reduced to normal pressure or pressurized. Among them, dry drawing is preferable in consideration of the production efficiency and cost efficiency.

In the case where a polymethyl pentene-based resin is used as the second component, the drawing treatment is preferably performed at a higher temperature. The drawing temperature can be, for example, 60 to 150° C., preferably 90 to 150° C., more preferably 120 to 150° C., even more preferably 130 to 150° C., and particularly preferably 135 to 150° C. If the drawing treatment is performed at a drawing temperature that satisfies the above range, even when a polymethyl pentene-based resin that is generally regarded as difficult to stretch is contained, the fiber can be drawn to a high degree.

Also, in the case where a polymethyl pentene-based resin is used as the second component, the drawing ratio is preferably 60 to 90% of the maximum drawing ratio and 4.5 times or greater. In terms of production efficiency, the drawing ratio is more preferably 4.5 to 8 times, even more preferably 4.5 to 7.5 times, particularly preferably 5 to 7 times, and most preferably 5 to 6.5 times. If the drawing ratio is 60 to 90% of the maximum drawing ratio, even a fiber containing a polymethyl pentene-based resin which is generally regarded as difficult to stretch and likely to undergo yarn breakage can be drawn to a high degree. From the viewpoint of significantly obtaining such effects, the drawing ratio is preferably 60 to 80% of the maximum drawing ratio. Also, the fiber that has been drawn by 4.5 times or greater has improved splittability due to the crystallization of the fiber being facilitated.

In the present invention, "maximum drawing ratio" refers to a ratio measured as follows. Melt spinning is performed using a split type conjugate nozzle, and the obtained undrawn fiber bundle is subjected to dry drawing using a metal roll whose surface temperature has been adjusted to a predetermined temperature. At this time, the dispensing speed (V1) of the roll dispensing the undrawn fiber bundle is set to 10 m/sec and the winding speed (V2) of a winding metal roll is gradually increased from 10 m/sec. Then, the winding speed of the winding metal roll when the undrawn fiber bundle is broken is defined as the maximum drawing speed, and the ratio (V2/V1) between the maximum drawing speed and the dispensing speed of the roll dispensing the undrawn fiber bundle is determined, and the obtained speed ratio is defined as the maximum drawing ratio (Vmax). A maximum drawing ratio of 7.5 or greater is preferable because if an undrawn fiber bundle made of fibers having a fineness of around 10 dtex in an undrawn state is drawn, a polyolefin-based split-type conjugate fiber having a fineness after drawing of 2.2 dtex or less can be easily obtained. Even if the maximum drawing ratio is less than 7.5, it has no influence on the drawing treatment, but due to the maximum drawing ratio being low, it may be difficult to obtain a polyolefin-based split-type conjugate fiber having a desired fineness from an undrawn fiber bundle whose fineness in an undrawn state is relatively large, for example, from an undrawn fiber bundle made of fibers having a fineness of 12 dtex or greater.

A predetermined amount of fiber treating agent is caused to adhere to the obtained drawn filament if necessary. Furthermore, a mechanical crimp is applied by a crimper (crimping apparatus) if necessary. As will be described later, the fiber treating agent allows fibers to be dispersed easily in water or the like in the case where a non-woven fabric is produced by a wet papermaking method. Dispersibility in water or the like is further improved by application of an external force to the fibers to which the fiber treating agent has adhered from the fiber surface (the external force being, for example, a force applied during crimping with a crimper) so as to cause the fiber treating agent to permeate into the fibers. The number of crimps is preferably 5 to 30 crimps per 25 mm, more preferably 10 to 20 crimps per 25 mm. If the number of crimps is 5 crimps per 25 mm or greater, due to the external force being applied by a crimper, splittability is improved. If the number of crimps is 30 crimps per 25 mm or less, there is little or no possibility that the fibers might coagulate into lumps.

The filament to which the fiber treating agent has been applied (or the filament to which the fiber treating agent is not applied but that is in a wet state) is subjected to a dry treatment at a temperature of 80 to 110° C. for several seconds to approximately 30 minutes so as to dry the fibers. The dry treatment may be omitted depending on the situation. After that, the filament is cut into a fiber length of preferably 1 to 100 mm, and more preferably 2 to 70 mm. As will be described later, in the case where a non-woven fabric is produced by a wet papermaking method, it is more preferable to set the fiber length to 3 to 20 mm. In the case where a non-woven fabric is produced by a wet papermaking method, the division ratio of the split-type conjugate fiber increases as the fiber length becomes shorter. Alternatively, in the case where a non-woven fabric is produced by a carding method, it is more preferable to set the fiber length to 20 to 100 mm. In the case where a fiber assembly is formed by a spun bonding method, the filament cutting processing may be omitted.

The polyolefin-based split-type conjugate fiber of the present invention preferably has a single fiber strength according to JIS L 1015 of 3 cN/dtex or greater, more preferably 4 cN/dtex or greater, and even more preferably 5 cN/dtex or greater. A preferable upper limit is 10 cN/dtex. If the split-type conjugate fiber has a single fiber strength of 3 cN/dtex or greater, it is possible to obtain a fiber assembly having an excellent puncture strength. The split-type conjugate fiber having such a single fiber strength can be obtained easily by setting the drawing ratio to 4.5 times or greater.

The polyolefin-based split-type conjugate fiber of the present invention preferably has a fiber elongation according to JIS L 1015 of 50% or less, more preferably 40% or less, and even more preferably 35% or less. A preferable lower limit is 0%. If the split-type conjugate fiber has a fiber elongation of 50% or less, it is possible to obtain a fiber assembly that is unlikely to be extended by an external force. Particularly when it is used as a fiber constituting a battery separator, extension during the production process can be suppressed, and therefore a battery separator with little shrinkage can be obtained.

(Fiber Assembly)

A fiber assembly containing a polyolefin-based split-type conjugate fiber according to the present invention will be described next. There is no particular limitation on the form of the fiber assembly, but the fiber assembly can be, for example, a weave, a knit, a non-woven fabric or the like. Also, there is no particular limitation on the form of fiber web of the non-woven fabric, and examples thereof include a carded web formed by a carding method, an air-laid web formed by an air-laid method, a wet paper web formed by a wet papermaking method, a spun bonded web formed by a spun bonding method, and the like.

In the fiber assembly, the amount of the split-type conjugate fiber is preferably 10 mass % or greater, more preferably 15 mass % or greater, and particularly preferably 20 mass % or greater. If the amount of the split-type conjugate fiber is 10 mass % or greater, the split-type conjugate fiber accounts for a large proportion in the fiber assembly such as a non-woven fabric, and thus a dense non-woven fabric is likely to be obtained. In the fiber assembly, there is no particular limitation on the upper limit of the amount of the polyolefin-based split-type conjugate fiber, but in the case of the fiber assembly required to have a certain gap between constituent fibers as well as an air permeability and a liquid permeability such as various types of fiber assemblies for wiping such as personal and/or objective wipers, fiber assemblies for battery separators used in various types of secondary batteries such as lithium ion batteries and nickel-metal hydride batteries, and fiber assemblies for filtration layers in various types of filters such as cartridge filters and laminate filters, the amount of the split-type conjugate fiber in the whole fiber assembly is preferably 90 mass % or less, more preferably 75 mass % or less, and particularly preferably 50 mass % or less. If the proportion of the split-type conjugate fiber contained in the fiber assembly such as a dry non-woven fabric or a wet non-woven fabric is 90 mass % or less, the ultrafine fibers derived from the split-type conjugate fiber does not account for too large a proportion in the obtained fiber assembly, and there is no possibility that the fiber assembly might become a non-woven fabric that is denser than necessary. Also, in the case where the split-type conjugate fiber is used to produce a wet non-woven fabric, if the amount of the split-type conjugate fiber is 90 mass % or less, during defibration at the time of slurry preparation in a wet papermaking process, a fiber floating phenomenon is unlikely to occur in which unsplit split-type conjugate fibers float to the surface of the slurry, and therefore good process performance is attained. Also, there is little possibility that ultrafine fibers that have been split and are sticking out might entangle with each other or the ultrafine fibers might entangle with other fibers, and that a fiber ball phenomenon might occur, and thus a non-woven fabric of uniform texture is likely to be obtained. If a particularly dense fiber assembly having less gaps between fibers constituting the fiber assembly is necessary, despite its application being any of those listed above, the amount of the split-type conjugate fiber is preferably larger, and it may be a fiber assembly containing the split-type conjugate fiber in an amount exceeding 90 mass %, or a fiber assembly composed only of the split-type conjugate fiber.

In the fiber assembly, there is no particular limitation on fiber materials that are mixed other than the split-type conjugate fiber. Examples thereof include cellulose-based fibers such as cotton, pulp, hemp, viscose rayon and Tencel (registered trademark); polyester-based fibers such as polyethylene terephthalate, polybutylene terephthalate, polytrimethylene terephthalate, polyethylene naphthalate, polylactic acid and polybutylene succinate; polyamide-based fibers such as nylon 6, nylon 66, nylon 11 and nylon 12; acrylic fibers; and the like. Other examples include single fibers of polyethylene such as low density polyethylene, high density polyethylene and linear low density polyethylene; single fibers of polypropylene, such as isotactic, atactic and syndiotactic polypropylene polymerized with an ordinary Ziegler-Natta catalyst or a metallocene catalyst; and polyolefin-based fibers such as a copolymerized polymer of monomers of any of the above polyolefins, and a polyolefin obtained by using a metallocene catalyst (also called a "Kaminsky catalyst") when polymerizing any of the above polyolefins. It is also possible to use fibers made of engineering plastic such as polycarbonate, polyacetal, polystyrene and cyclic polyolefin. The fibers listed above can be used singly or in a combination of two or more. There is no particular limitation on the fiber shape, and examples thereof include single fibers, sheath core type conjugate fibers, off-center sheath core type conjugate fibers, multi-core sheath type conjugate fibers, parallel conjugate fibers, sea island type conjugate fibers, split-type conjugate fibers and the like. The fiber cross section may be any of a circular shape, an irregular shape and the like.

The fiber assembly may contain a binder fiber in an amount of 90 mass % or less. The amount of the binder fiber in the fiber assembly is preferably 85 mass % or less, and more preferably 80 mass % or less. The binder fiber (thermobonding fiber) may be, for example, a sheath core type conjugate fiber, or may be a core sheath type conjugate ultrafine fiber as described above. The fiber assembly containing a thermobonding fiber has an excellent tensile strength and puncture strength because the constituent fibers are bonded.

It is preferable that the fiber assembly contains ultrafine fibers formed by the split-type conjugate fiber being split in a proportion of 10 mass % or greater. In other words, the fiber assembly preferably contains a ultrafine fiber A and a ultrafine fiber B in a proportion of 10 mass % or greater in total The fiber assembly contains the ultrafine fibers in a proportion of more preferably 20 mass % or greater, and even more preferably 35 mass % or greater. A preferable upper limit is 100 mass %. If the split-type conjugate fiber accounts for a large proportion in the fiber assembly, it is likely to obtain a dense non-woven fabric easily.

Particularly when the ultrafine fiber B is a core sheath type conjugate ultrafine fiber, the fiber assembly preferably contains the ultrafine fiber B in a proportion of 10 mass % or greater, more preferably in a proportion of 20 mass % or greater, and particularly preferably in a proportion of 35 mass % or greater. A preferable upper limit is 50 mass %. If the non-woven fabric contains a core sheath type conjugate ultrafine fiber as the ultrafine fiber B in the above-described proportion, because the core sheath type conjugate fiber having a small fineness (less than 0.6 dtex) is contained, it is possible to attain a mechanical strength higher than that of a non-woven fabric containing the same amount of a core sheath type conjugate fiber having a large fineness. Accordingly, a fiber assembly that is thin and has an excellent mechanical strength can be obtained.

The fiber assembly preferably has a total amount of fibers having a small fineness (less than 0.6 dtex) of 10 mass % or greater, more preferably 20 mass % or greater, even more preferably 50 mass % or greater, and particularly preferably 70 mass % or greater. A preferable upper limit is 100 mass %. If the total amount of fibers having a small fineness (less than 0.6 dtex) in the fiber assembly is within the above range, it is possible to obtain easily a fiber assembly having a small thickness. The fibers having a small fineness (less than 0.6 dtex) in the fiber assembly may be composed of a ultrafine fiber A and a ultrafine fiber B, or may be composed of these ultrafine fibers and other ultrafine fibers.

In the fiber assembly, the split-type conjugate fiber can be split by application of a physical impact. The split-type conjugate fiber can be split by, for example, a hydroentanglement treatment (injection of a stream of high pressure water). Alternatively, in the case where a non-woven fabric is produced by a wet papermaking method, the split-type conjugate fiber can be split by utilization of an impact received during defibration in the papermaking process.

In the fiber assembly, the division ratio of the split-type conjugate fiber is preferably 80% or greater. The division ratio of the split-type conjugate fiber in the fiber assembly is more preferably 85% or greater, and particularly preferably 90% or greater. In the present invention, the division ratio can be measured in a manner described later.

A method for producing the fiber assembly will be described taking a non-woven fabric as an example. The non-woven fabric can be produced by producing a fiber web according to a known method and thereafter, if necessary, subjecting the fiber web to a heat treatment so as to thermally bond the fibers. The fiber web may be subjected to a fiber entanglement treatment if necessary. The fiber web can be produced by, for example, a dry method such as a carding method or an air-laid method using a split-type conjugate fiber having a fiber length of 10 to 80 mm, or by a wet papermaking method using a split-type conjugate fiber having a fiber length of 2 to 20 mm. In the case where the fiber assembly is used in the fields such as personal and/or objective wipers and filters, a non-woven fabric produced by the dry method such a carding method or an air-laid method is preferable. This is because non-woven fabrics produced by the dry method have a soft feel and an appropriate density. In the case where the fiber assembly is used in the fields such as battery separators, a non-woven fabric produced from a wet paper web is preferable. This is because non-woven fabrics produced by using a wet papermaking web are generally dense and have a good texture. Furthermore, with the wet papermaking method, the split-type conjugate fiber can be split at a desired division ratio by performing only a dissociation treatment by adjusting the conditions for the dissociation treatment in the papermaking process.

Next, the fiber web may be subjected to a thermal bonding treatment. It may be possible, for example, to add a core sheath type conjugate fiber (binder fiber) to the split-type conjugate fiber and bond the fibers with the sheath component of the core sheath type conjugate fiber. Alternatively, in the case where the ultrafine fiber B is a core sheath type conjugate ultrafine fiber, the fibers may be bonded by the sheath component of the core sheath type conjugate ultrafine fiber. The conditions for the thermal bonding treatment can be selected as appropriate according to the basis weight of the fiber web, the cross-sectional shape of the core sheath type conjugate ultrafine fiber, the type of resin constituting the fibers contained in the non-woven fabric, and the like. As the heat treatment machine, a cylinder dryer, a hot air blasting machine, a heat roll processing machine, a heat emboss processing machine or the like can be used. Particularly, a cylinder dryer is preferable because the fibers can be thermally bonded while adjusting the thickness of the non-woven fabric. The heat treatment temperature by a cylinder dryer, for example, is preferably 80 to 160° C. in the case where the sheath component of the binder fiber is an ethylene vinyl alcohol copolymer, and is preferably 100 to 160° C. in the case where the sheath component of the binder fiber is polyethylene.

In the case where the fiber web is subjected to a hydroentanglement treatment, the thermal bonding treatment is preferably carried out before the hydroentanglement treatment, which will be described later. When the hydroentanglement treatment is carried out after the fibers of the fiber web have been bonded in advance, "escaping" of fibers is unlikely to occur during application of a stream of high pressure water to the fibers, as a result of which the fibers can be firmly entangled with each other, and the split-type conjugate fiber can be split more efficiently. The thermal bonding treatment may be carried out after the fibers have been entangled with each other. In other words, there is no particular limitation on the order in which the thermal bonding treatment and the hydroentanglement treatment are carried out as long as a desired non-woven fabric can be obtained.

In the fiber assembly of the present invention, the fibers may be entangled with each other. A preferable method for causing the fibers to be entangled with each other is a hydroentanglement treatment in which the fibers are entangled with each other by the action of a stream of high pressure water. With the hydroentanglement treatment, the fibers can be firmly entangled with each other without impairing the density of the non-woven fabric as a whole. The hydroentanglement treatment can also promote splitting of the split-type conjugate fiber and entanglement of the resulting ultrafine fibers with each other, at the same time when the fibers are entangled with each other.

The conditions for the hydroentanglement treatment can be selected as appropriate according to the type and basis weight of the fiber web used, the type and proportion of fibers contained in the fiber web, and the like. In the case where a wet paper web having a basis weight of 10 to 100 g/m$^2$ is subjected to the hydroentanglement treatment, it is possible, for example, to place the fiber web on a support such as an approximately 70 to 100-mesh plain weave fabric structure and inject a columnar stream of water at a water pressure of 1 to 15 MPa, and more preferably 2 to 10 MPa to one or both sides of the fiber web one to ten times from a nozzle provided with orifices having a pore size of 0.05 to 0.3 mm at an interval of 0.5 to 1.5 mm. The fiber web that has undergone the hydroentanglement treatment is subjected to a dry treatment if necessary.

The fiber assembly may be subjected to a hydrophilization treatment if necessary. The hydrophilization treatment can be carried out by any method such as a fluorine gas treatment, a vinyl monomer graft polymerization treatment, a sulfonation treatment, a discharge treatment, a surfactant treatment and a hydrophilic resin application treatment. Particularly when the fiber assembly is used as a battery separator, the fiber assembly is preferably subjected to the hydrophilization treatment. This is in order to enhance the affinity with electrolytes to improve electrolyte retentivity.

The fiber assembly preferably has a basis weight of 2 to 100 g/m$^2$, more preferably 10 to 100 g/m$^2$, even more preferably 20 to 80 g/m$^2$, and particularly preferably 30 to 60 g/m$^2$. If the fiber web has a basis weight of 2 g/m$^2$ or greater, the fiber web and the fiber assembly have a good texture, and thus the strength and puncture strength of the fiber assembly tend to be high. If the fiber web has a basis weight of 100 g/m$^2$ or less, the air permeability of the fiber assembly is not reduced. Also, when the split-type conjugate fiber contained in the fiber web is split into respective components by the hydroentanglement treatment, a stream of high pressure water can act uniformly on the entire fiber web, making it easy to split the split-type conjugate fiber sufficiently.

Also, with the present invention, a configuration is possible in which a core sheath type conjugate segment is used as the second component, and ultrafine fibers are bonded to each other by the sheath component of the core sheath type conjugate ultrafine fiber derived from the second component, as a result of which it is possible to form a fiber assembly whose interfiber space is bonded only with the ultrafine fibers. The fiber assembly as described above is preferably in a form of for example, a non-woven fabric, and can be used as a battery separator. In this case, the fiber assembly preferably has a basis weight of 5 to 50 g/m², and more preferably 10 to 30 g/m².

A preferable example of the method for producing the non-woven fabric is a wet papermaking method. The wet papermaking may be performed by an ordinary method. First, a split-type conjugate fiber as described above is prepared and dispersed in water at a concentration of 0.01 to 0.6 mass % so as to give a slurry. The split-type conjugate fiber has excellent splittability even with a small impact, and thus can be easily split by defibration or refining at the time of slurry preparation. Next, the slurry is formed into a wet paper web in a dampened state by papermaking using a papermaking machine such as a short-wire papermaking machine, a cylinder papermaking machine, a long-wire papermaking machine, or any combination of a short-wire papermaking machine, a cylinder papermaking machine and a long-wire papermaking machine. Next, the wet paper web in a dampened state is dried with a heat treatment machine such as a cylinder dryer. If necessary, a binder fiber may be provided and bonded while drying. As another method, it is possible to bond the wet paper web if necessary so as to stabilize its shape, and thereafter perform a hydroentanglement treatment so as to split unsplit split-type conjugate fibers and entangle the fibers. In the wet non-woven fabric, a division ratio of 80% or greater is preferable because the fiber is split sufficiently by only simple stirring that does not use a stream of high pressure water such as a mixing treatment (pulper treatment) in the wet non-woven fabric production process, whereby ultrafine fibers can be obtained. In the wet non-woven fabric, even if the division ratio is less than 80%, there is no problem with production of various types of fiber assemblies such as wet non-woven fabrics. However, because the fiber is not split sufficiently by only simple stirring that does not use a stream of high pressure water such as a mixing treatment in the wet non-woven fabric production process, in order to obtain ultrafine fibers by splitting the split-type conjugate fiber, a splitting treatment that uses a stream of high pressure water is likely to be needed.

With the split-type conjugate fiber of the present invention, it is possible to produce a fiber assembly, such as a non-woven fabric, that is dense and has good texture as well as having excellent extensibility and splittability as described above. Also, the fiber assembly using the split-type conjugate fiber of the present invention can achieve a high puncture strength due to inclusion of a polypropylene-based resin having a Q value of 6 or greater. For example, in the case where the fiber assembly is a non-woven fabric and the non-woven fabric has a basis weight of about 2 to 50 g/m², the fiber assembly preferably has a puncture strength per unit basis weight of 0.02 N or greater. In the case where the non-woven fabric has a basis weight of about 50 to 100 g/m², the fiber assembly preferably has a puncture strength per unit basis weight of 0.04 N or greater. There is no particular limitation on the upper limit of the puncture strength per unit basis weight, but the upper limit is preferably 1 N or less.

(Battery Separator)

The fiber assembly described above can be used as a battery separator. The battery separator preferably contains the split-type conjugate fiber in an amount of 15 to 100 mass %. In the case of constituting a battery separator using the split-type conjugate fiber of the present invention as a main component (the component that accounts for the largest proportion), the split-type conjugate fiber of the present invention preferably is contained in an amount of 40 to 100 mass %. This battery separator has an even more excellent puncture strength. Alternatively, in the case where a battery separator is constituted using the split-type conjugate fiber of the present invention as an auxiliary component (the component that does not account for the largest proportion), the split-type conjugate fiber of the present invention is preferably contained in an amount of 15 to 45 mass %. This battery separator can achieve both a puncture strength and an air permeability.

From the viewpoint of electrolyte retentivity, an excellent compression recovery and a small thermal contraction at a high temperature, the battery separator is preferably made of a non-woven fabric.

The non-woven fabric constituting a battery separator preferably contains a ultrafine fiber A, which is formed by the split-type conjugate fiber being split, in a proportion of 5 mass % or greater, more preferably 10 mass % or greater, even more preferably 20 mass % or greater, and particularly preferably 35 mass % or greater. A preferable upper limit is 80 mass %, and a more preferable upper limit is 50 mass %. The non-woven fabric constituting a battery separator contains ultrafine fibers having a small fineness of less than 0.6 dtex, and thus the battery separator can be made thin. Furthermore, by containing the ultrafine fiber A whose primary component is a polypropylene-based resin in a proportion of 5 mass % or greater, an excellent puncture strength can be achieved.

Also, the non-woven fabric constituting a battery separator preferably contains a ultrafine fiber B formed by the split-type conjugate fiber being split, in a proportion of 5 to 80 mass %. Particularly when the ultrafine fiber B is a core sheath type conjugate ultrafine fiber, the ultrafine fiber B is contained in a proportion of preferably 10 mass % or greater, more preferably 20 mass % or greater, and particularly preferably 35 mass % or greater. A preferable upper limit is 50 mass %. If the non-woven fabric contains a core sheath type conjugate ultrafine fiber as the ultrafine fiber B in the above-described amount, due to the inclusion of the core sheath type conjugate fiber having a small fineness of less than 0.6 dtex, the non-woven fabric has a mechanical strength higher than the non-woven fabric containing the same amount of a core sheath type conjugate fiber having a large fineness. Also, a separator that is thin and has an excellent mechanical strength can be obtained.

The non-woven fabric constituting a battery separator preferably has a basis weight of 2 to 100 g/m², more preferably 5 to 50 g/m², and particularly preferably 10 to 30 g/m². If the basis weight is less than 2 g/m², the non-woven fabric has a low density, and a short circuit may occur when used as a battery separator. It on the other hand, the basis weight exceeds 100 g/m², the battery separator becomes thick, and thus the amount of the positive and negative electrodes in the battery is reduced accordingly.

In the case where the battery separator is a battery separator for a lithium ion secondary battery, the non-woven fabric constituting the battery separator preferably has a basis weight of 2 to 30 g/m². The non-woven fabric having a basis weight of 2 to 30 g/m² has a thickness of 30 μm or less, preferably 20 μm or less, and can be used in place of a film that is generally used as a battery separator for a lithium ion secondary battery.

The battery separator has a high puncture strength. For example, in the case where the non-woven fabric constituting the battery separator has a basis weight of about 2 to 50 g/m², the battery separator preferably has a puncture strength per unit basis weight of 0.02 N or greater. In the case where the non-woven fabric has a basis weight of about 50 to 100 g/m², the battery separator preferably has a puncture strength per unit basis weight of 0.04 N or greater. There is no particular limitation on the upper limit of the puncture strength per unit basis weight, but the upper limit is preferably 1 N or less.

The battery separator of the present invention is incorporated in various types of batteries to constitute batteries. For example, a cylindrical lithium ion secondary battery can be obtained by spirally winding a positive electrode plate and a negative electrode plate with the battery separator of the present invention interposed therebetween. The battery separator of the present invention is also applicable in other batteries, such as, for example, a nickel hydrogen secondary battery, a nickel-cadmium secondary battery, a nickel-iron secondary battery and a nickel-zinc secondary battery.

EXAMPLES

Hereinafter, the present invention will be described in further detail by way of examples. However, the present invention is not limited to the examples given below.

Measurement methods and evaluation methods used in the following examples will be described first.

(Number-Average Molecular Weight Mn, Weight Average Molecular Weight Mw, Z Average Molecular Weight Mz and Q Value)

The number average molecular weight Mn, the weight average molecular weight Mw, the z average molecular weight Mz, and the ratio of weight average molecular weight and number average molecular weight (Mn/Mw: Q value) were measured by gel permeation chromatography (GPC) using ortho dichloro benzene (ODCB) as a solvent for measurement and also using a cross-fractionation apparatus (CFC) and a Fourier transform infrared spectroscope (FT-IR).

(Melt Flow Rate, MFR)

A polypropylene-based resin was measured at 230° C. under an applied load of 21.18 N according to JIS K 7210, and a polymethyl pentene-based resin was measured at 260° C. under an applied load of 5.0 kgf (49.0 N) according to ASTM D 1238.

(Tensile Modulus)

The tensile modulus of resin was measured according to the measurement method defined in JIS K 7161.

(Rockwell Hardness)

The Rockwell hardness of resin was measured according to the measurement method defined in ASTM D 785.

(Extensibility)

Melt spinning was performed using a split type conjugate nozzle, and the obtained undrawn fiber bundle was subjected to dry drawing using a metal roll whose surface temperature was adjusted to a predetermined temperature (105° C., 120° C., 130° C., 140° C. or the like). At this time, the dispensing speed (V1) of the roll dispensing the undrawn fiber bundle was set to 10 m/sec, and the winding speed (V2) of the winding metal roll was gradually increased from 10 msec. Then, the winding speed of the winding metal roll when the undrawn fiber bundle was broken was defined as the maximum drawing speed, and the ratio (V2/V1) between the maximum drawing speed and the dispensing speed of the roll dispensing the undrawn fiber bundle was determined, and the obtained speed ratio was defined as the maximum drawing ratio (Vmax). The extensibility of the obtained polyolefin-based split-type conjugate fiber was evaluated as follows based on the maximum drawing ratio (Vmax).

1: When the maximum drawing ratio (Vmax) was 7.5 or greater
2: When the maximum drawing ratio (Vmax) was 7.0 or greater and less than 7.5
3: When the maximum drawing ratio (Vmax) was 6.5 or greater and less than 7.0
4: When the maximum drawing ratio (Vmax) was 6.0 or greater and less than 6.5
5: When the maximum drawing ratio (Vmax) was less than 6.0

(Division Ratio Measuring Method 1)

A fiber assembly such as a non-woven fabric containing the polyolefin-based split-type conjugate fiber of the present invention was bundled without a space, a cross section of the fiber assembly was captured at any three points with a magnification of 1000 times by using an electron microscope, and the division ratio was calculated based on the area ratio of split fibers in the captured micrographs.

(Division Ratio Measuring Method 2)

Prior to a heat application treatment, the wet paper web was packed in a tube as tightly as possible such that the cut surface in the thickness direction of the web was exposed. The wet paper web (non-woven fabric) packed in the tube was magnified 300 times by an electron microscope, and a region having a size of 0.4 mm×0.3 mm was captured. The cross section of each fiber in the captured micrograph was checked, and the number of fibers composed of the ultrafine fiber A (first component) and the number of fibers composed of the ultrafine fiber B (second component) were counted. Also, the number of constituent components of an unsplit fiber was determined by visual inspection (for example, in the case of the fiber cross sections shown in FIGS. 2A, 2B and 1D, the number of constituent components of the fiber that is not split at all is 16, and the number of constituent components of the fiber that is split into half is 8), and the number of constituent components was counted as the number of unsplit fibers. It for example, there is one unsplit fiber, and the number of constituent components is 16, the fiber is counted as 16. From the count results, the division ratio was calculated based on the following equation.

Division ratio (%)=[(the number of fibers composed of ultrafine fiber $A$+the number of fibers composed of ultrafine fiber/(the total of the number of fibers composed of ultrafine fiber $A$+the number of fibers composed of ultrafine fiber $B$+the number of unsplit fibers)]×100

(Splittability)

Splittability was evaluated as follows based on the division ratio of the polyolefin-based split-type conjugate fiber measured by the division ratio measuring method 1 described above.

1: When the division ratio was 80% or greater
2: When the division ratio was 70% or greater and less than 80%
3: When the division ratio was 60% or greater and less than 70%
4: When the division ratio was 50% or greater and less than 60%
5: When the division ratio was less than 50%

(Fineness)

Fineness was measured based on the JIS L 1015 8.5.1 B method (simple method).

(Basis Weight)

The basis weight of the non-woven fabric was measured according to JIS L 1913 6.2.

(Thickness)

The thickness of the non-woven fabric was measured with a thickness measuring machine (trade name: THICKNESS GAUGE, model CR-60A available from Daiei Kagaku Seiki MFG. Co., Ltd.) in a state in which a load of 2.94 cN was applied per 1 cm$^2$ of a sample.

(Air Permeability)

The air permeability of the non-woven fabric (or battery separator) was measured using a Frazier type testing machine according to JIS L 1096.

(Tensile Strength)

A sample piece having a width of 5 cm and a length of 30 cm was subjected to a tensile test according to JIS L 1096 8.12.1A (strip method) by using a constant-rate-of-extension tensile testing machine under conditions of a clamp interval of 10 cm and an extension speed of 30±2 cm/min, and the load value at the time of breakage was measured and defined as a tensile strength. The tensile test was carried out with respect to the vertical direction (machine direction) of the non-woven fabric.

(Puncture Strength)

Puncture strength refers to a stress (maximum penetration force F) at a penetration point by a needle penetration force measurement, and was measured in the following manner. First, a non-woven fabric (or battery separator) cut so as to have a length of 30 mm and a width of 100 mm was prepared as a sample. The sample was placed on a support having a cylindrical penetration hole (diameter 11 mm) in a Handy-type Compression Tester (KES-G5 available from Kato Tech Co., Ltd.). Next, a pressing plate made of an aluminum plate having a length of 46 mm, a width of 86 mm and a thickness of 7 mm, and also having a 11 mm diameter hole in the center portion thereof was placed on the sample on the support such that the hole of the pressing plate and the cylindrical penetration hole of the support were aligned. Next, the load when a conical needle having a height of 18.7 mm and a bottom diameter of 2.2 mm, with its tip shape being a 1 mm sphere, was vertically inserted into the center of the pressing plate at a speed of 2 mm/sec and the length when the sample was pressed and deformed by the conical needle were measured, and then among the measured loads, the stress at the penetration point at which the conical needle penetrated the sample was defined as the maximum penetration force F (N), or in other words, the puncture strength. Four samples were made from a single non-woven fabric (battery separator), and for each sample, measurement was performed at 15 different points, and the average of the values measured at a total of 60 points was determined as the puncture strength.

(Single Fiber Strength and Fiber Elongation)

Single fiber strength and fiber elongation were measured according to JIS L 1015 using a tensile testing machine. The load value and elongation when the fiber was broken were measured, with the clamp interval of the sample being set to 20 mm, and defined as the single fiber strength and the fiber elongation, respectively.

Example 1

A homopolypropylene resin having a Q value of 10.7, an Mn of 51000, an Mw of 540000, an Mz of 3000000, an MFR 230 of 10 g/10 min and a tensile modulus of 2400 MPa was used as the first component, and a polymethyl pentene-based resin (DX820 available from Mitsui Chemicals, Inc.) having a melting point of 238° C., an MFR 260 of 180 g/10 min, a tensile modulus of 1765 MPa and a Rockwell hardness of 90 was prepared as the second component. Next, the first component was melt spun at a spinning temperature of 350° C. and the second component was melt spun at a spinning temperature of 280° C., with the conjugate ratio (volume ratio) between the first component and the second component being set to 5:5, by using a hollow 8 split type conjugate nozzle, whereby an undrawn split-type conjugate fiber (undrawn fiber bundle, spun filament) that had a fineness of 10 dtex and a fiber cross section as shown in FIG. 1A having a gear-like shape divided into 8 parts with a hollow portion in the center (hereinafter referred to as a "hollow 8 split shape") was obtained.

The obtained undrawn fiber bundle (spun filament) was subjected to dry drawing using a metal roll having a surface temperature of 140° C. The maximum drawing ratio was first determined by the above-described method, and the undrawn fiber bundle was found to have a maximum drawing ratio of 7.5 times. Accordingly, the spun filament was drawn at the same temperature at a drawing ratio of 5 times which is 66.7% of the maximum drawing ratio, whereby a split-type conjugate fiber (drawn filament) having a fineness of 2.0 dtex and a hollow 8 split shape with a hollow ratio of 20% was obtained.

Next, the split-type conjugate fiber obtained above was cut to a fiber length of 6 mm. An olefin-based core sheath type conjugate fiber (NBF (H) available from Daiwabo Polytec Co., Ltd.) having a fineness of 2.0 dtex and a fiber length of 6 mm was prepared as the binder fiber. The split-type conjugate fiber having a fiber length of 6 mm obtained above and the binder fiber were mixed at a mass ratio of 50:50. The obtained fiber mixture was added at 3.5 g/l so as to prepare an aqueous dispersion, and the aqueous dispersion was stirred with a home use mixer (National MX-151S available from Panasonic Corporation) instead of a pulper at an approximately 4000 revolutions/min for two minutes so as to split the split-type conjugate fiber. Subsequently, water was added to the stirred aqueous dispersion to prepare 16 liters of a slurry, and the slurry was subjected to wet papermaking by an ordinary method, whereby a wet paper web was produced. The obtained wet paper web was subjected to a heat treatment at 140° C. using a cylinder dryer so as to bond the fibers with the olefin-based core sheath type conjugate fiber used as the binder fiber, whereby a wet non-woven fabric having a basis weight of 60 g/m$^2$ was obtained. At this time, the division ratio of the split-type conjugate fiber was 60%. Furthermore, a columnar stream of high pressure water at a 6 MPa was injected to the front and back sides of the wet non-woven fabric so as to split the split-type conjugate fiber and entangle the fibers at the same time. After that, the wet non-woven fabric was dried at 100° C. so as to thermally bond the fibers, whereby an entangled non-woven fabric was obtained. In the obtained entangled non-woven fabric, the division ratio of the split-type conjugate fiber was 100%.

Example 2

Melt spinning was performed under the same conditions as in Example 1, and the obtained undrawn fiber bundle was subjected to a drawing treatment at a drawing ratio of 5.9 times under the same temperature conditions as in Example 1A split-type conjugate fiber having a fineness of 1.7 dtex and a hollow ratio of 20% was thereby obtained. The drawing ratio was 78.7% of the maximum drawing ratio. A wet non-woven fabric was obtained in the same manner as in Example 1, rising the obtained split-type conjugate fiber. In the obtained wet non-woven fabric, the division ratio of the split-type conjugate fiber was 60%. Also, an entangled non-woven fabric was obtained from the wet non-woven fabric in the same manner as in Example 1. In the obtained entangled non-woven fabric, the division ratio of the split-type conjugate fiber was 100%.

Example 3

An undrawn fiber bundle (spun filament) having a fineness of 10 dtex and a fiber cross section as shown in FIG. 1B having a gear-like shape divided into 8 parts without a hollow portion was obtained by performing melt spinning under the same conditions as in Example 1, except that as the spinning nozzle, a solid 8 split type conjugate nozzle without a hollow portion was used for melt spinning. The obtained undrawn fiber bundle (spun filament) was drawn at a drawing ratio of 5.9 times under the same temperature conditions as in Example 1, whereby a split-type conjugate fiber having a fineness of 1.7 dtex and a solid 8 split shape was obtained. The drawing ratio was 78.7% of the maximum drawing ratio. A wet non-woven fabric was obtained in the same manner as in Example 1, using the obtained split-type conjugate fiber. In the obtained wet non-woven fabric, the division ratio of the split-type conjugate fiber was 55%. Also, an entangled non-woven fabric was obtained from the wet non-woven fabric in the same manner as in Example 1. In the obtained entangled non-woven fabric, the division ratio of the split-type conjugate fiber was 95%.

Example 4

An undrawn fiber bundle (spun filament) having a fineness of 10 dtex and a fiber cross section as shown in FIG. 1C having a gear-like shape divided into 16 parts with a hollow portion in the center was obtained by performing melt spinning under the same conditions as in Example 1, except that as the spinning nozzle, a 16 split type hollow conjugate nozzle was used for melt spinning. The obtained undrawn fiber bundle (spun filament) was drawn at a drawing ratio of 5.9 times under the same temperature conditions as in Example 1, whereby a split-type conjugate fiber having a fineness of 1.7 dtex and a hollow 16 split shape with a hollow ratio of 20% was obtained. The drawing ratio was 78.7% of the maximum drawing ratio. A wet non-woven fabric was obtained in the same manner as in Example 1, using the obtained split-type conjugate fiber. In the obtained wet non-woven fabric, the division ratio of the split-type conjugate fiber was 55%. Also, an entangled non-woven fabric was obtained from the wet non-woven fabric in the same manner as in Example 1. In the obtained entangled non-woven fabric, the division ratio of the split-type conjugate fiber was 100%.

Example 5

An undrawn fiber bundle (spun filament) having a fineness of 10 dtex and a fiber cross section as shown in FIG. 1D having a gear-like shape divided into 16 parts without a hollow portion was obtained by performing melt spinning under the same conditions as in Example 1, except that as the spinning nozzle, a solid 16 split type conjugate nozzle without a hollow portion was used for melt spinning. The obtained undrawn fiber bundle (spun filament) was drawn at a drawing ratio of 5.9 times under the same temperature conditions as in Example 1, whereby a split-type conjugate fiber having a fineness of 1.7 dtex and a solid 16 split shape was obtained. The drawing ratio was 78.7% of the maximum drawing ratio. A wet non-woven fabric was obtained in the same manner as in Example 1, using the obtained split-type conjugate fiber. In the obtained wet non-woven fabric, the division ratio of the split-type conjugate fiber was 50%. Also, an entangled non-woven fabric was obtained from the wet non-woven fabric in the same manner as in Example 1. In the obtained entangled non-woven fabric, the division ratio of the split-type conjugate fiber was 90%.

Example 6

A split-type conjugate fiber having a fineness of 2.0 dtex and a hollow 8 split shape having a hollow ratio of 20% was obtained in the same manner as in Example 1. Also, as the binder fiber, an olefin-based core sheath type conjugate fiber (NBF (H) available from Daiwabo Polytec Co., Ltd.) having a fineness of 2.0 dtex and a fiber length of 6 mm was prepared. The split-type conjugate fiber having a fiber length of 6 mm obtained above and the binder fiber were mixed at a mass ratio of 50:50. The obtained fiber mixture was added at 3.5 g/l so as to prepare an aqueous dispersion, and the aqueous dispersion was stirred with a home use mixer (National MX-151S available from Panasonic Corporation) instead of a pulper at an approximately 6000 revolutions/min for two minutes so as to split the split-type conjugate fiber. Subsequently, water was added to the stirred aqueous dispersion to prepare 16 liters of a slurry, and the slurry was subjected to wet papermaking by an ordinary method, whereby a wet paper web was produced. The obtained wet paper web was subjected to a heat treatment at 140° C. using a cylinder dryer so as to bond the fibers with the olefin-based core sheath type conjugate fiber used as the binder fiber, whereby a wet non-woven fabric having a basis weight of 60 g/m$^2$ was obtained. At this time, the division ratio of the polyolefin-based split-type conjugate fiber was 100%, from which it was confirmed that the split-type conjugate fiber exhibits a high level of splittability, without application of a columnar stream of high pressure water, by performing strong stirring by increasing the number of revolutions of the home use mixer that was used instead of a pulper.

Example 7

A undrawn fiber bundle (spun filament) was obtained by performing melt spinning under the same conditions as in Example 1, except that a mixed resin of a homopolypropylene resin having a Q value of 10.7, an Mn of 51000, an Mw of 540000, an Mz of 3000000, an MFR 230 of 10 g/10 min and a tensile modulus of 2400 MPa as the first component and a polypropylene-based resin (SA01A available from Japan Polypropylene Corporation) having a Q value of 3.0, an Mn of 75000, an Mw of 230000, an MFR 230 of 9 g/10 min, a tensile modulus of 1650 MPa and a Rockwell hardness of 100 mixed at a mass ratio of 50:50 was used, and the spinning temperature of the first component was changed to 320° C. The obtained undrawn fiber bundle was drawn at a drawing ratio of 5.0 times, which is 71.4% of the maximum drawing ratio, under the same temperature conditions as in Example 1, whereby a split-type conjugate fiber having a fineness of 2.0 dtex and a hollow ratio of 20% was obtained. The obtained split-type conjugate fiber was cut to a fiber length of 3 mm. After that, the obtained split-type conjugate fiber having a fiber length of 3 mm was added at 3.5 g/l so as to prepare an aqueous dispersion, and the aqueous dispersion was stirred with a home use mixer (National MX-151S available from Panasonic Corporation) instead of a pulper at an approximately 6000 revolutions/min for one minute so as to split the split-type conjugate fiber. Subsequently, water was added to the stirred aqueous dispersion to prepare 16 liters of a slurry, and the slurry was subjected to wet papermaking by an ordinary method, whereby a wet paper web was produced. The obtained wet paper web was subjected to a heat treatment at 140° C. using a cylinder dryer so as to dry the web, whereby a wet non-woven fabric having a basis weight of 53.3 g/m² was obtained.

Comparative Example 1

A polypropylene-based resin (SA03A available from Japan Polypropylene Corporation) having a Q value of 5.3, an Mn of 32000, an Mw of 171000, an Mz of 700000, an MFR 230 of 26 g/10 min, a tensile modulus of 1600 MPa, and a Rockwell hardness of 100 was used as the first component, and the same polymethyl pentene-based resin as used in Example 1 was used as the second component. Next, an undrawn fiber bundle (spun filament) having a fineness of 10 dtex and a fiber cross section as shown in FIG. 1A having a gear-like shape divided into 8 parts with a hollow portion in the center was obtained by melt spinning the first component at a spinning temperature of 300° C. and the second component at a spinning temperature of 280° C. using a hollow 8 split type conjugate nozzle, with the conjugate ratio (volume ratio) between the first component and the second component being set to 5:5. The obtained undrawn fiber bundle was drawn at a drawing ratio of 5.9 times using a metal roll having a surface temperature of 130° C., whereby a polyolefin-based split-type conjugate fiber having a fineness of 1.7 dtex and a hollow 8 split shape having a hollow ratio of 20% was obtained. The drawing ratio was 73.8% of the maximum drawing ratio. A wet non-woven fabric was obtained in the same manner as in Example 1, using the obtained split-type conjugate fiber. In the obtained wet non-woven fabric, the division ratio of the split-type conjugate fiber was 30%. Also, an entangled non-woven fabric was obtained from the wet non-woven fabric in the same manner as in Example 1. In the obtained entangled non-woven fabric, the division ratio of the split-type conjugate fiber was 65%.

Comparative Example 2

A polypropylene-based resin (SA03 available from Japan Polypropylene Corporation) having a Q value of 2.8, an Mn of 60000, an Mw of 170000, an MFR 230 of 30 g/10 min, a tensile modulus of 1650 MPa, and a Rockwell hardness of 100 was used as the first component, and the same polymethyl pentene-based resin as used in Example 1 was used as the second component. Next, an undrawn fiber bundle (spun filament) having a fineness of 10 dtex and a fiber cross section as shown in FIG. 1A having a gearlike shape divided into 8 parts with a hollow portion in the center was obtained by melt spinning the first component at a spinning temperature of 270° C. and the second component at a spinning temperature of 280° C. using a hollow 8 split type conjugate nozzle, with the conjugate ratio (volume ratio) between the first component and the second component being set to 5:5. The obtained undrawn fiber bundle was drawn at a drawing ratio of 5.9 times using a metal roll having a surface temperature of 130° C., whereby a split-type conjugate fiber having a fineness of 1.7 dtex and a hollow 8 split shape having a hollow ratio of 20% was obtained. The drawing ratio was 72.8% of the maximum drawing ratio. A wet non-woven fabric was obtained in the same manner as in Example 1, using the obtained split-type conjugate fiber. In the obtained wet non-woven fabric, the division ratio of the split-type conjugate fiber was 35%. Also, an entangled non-woven fabric was obtained from the wet non-woven fabric in the same manner as in Example 1. In the obtained entangled non-woven fabric, the division ratio of the split-type conjugate fiber was 65%.

Comparative Example 3

A polypropylene-based resin (SA03B available from Japan Polypropylene Corporation) having a Q value of 4.4, an MFR 230 of 30 g/10 min, a tensile modulus of 1600 MPa, and a Rockwell hardness of 100 was used as the first component, and the same polymethyl pentene-based resin as used in Example 1 was used as the second component. An undrawn fiber bundle (spun filament) having a fineness of 10 dtex and a fiber cross section as shown in FIG. 1A having a gear-like shape divided into 8 parts with a hollow portion in the center was obtained by melt spinning the first component at a spinning temperature of 270° C. and the second component at a spinning temperature of 280° C. using a hollow 8 split type conjugate nozzle, with the conjugate ratio (volume ratio) between the first component and the second component being set to 5:5. The obtained undrawn fiber bundle was drawn at a drawing ratio of 5.9 times using a metal roll having a surface temperature of 130° C., whereby a split-type conjugate fiber having a fineness of 1.7 dtex and a hollow 8 split shape having a hollow ratio of 20% was obtained. The drawing ratio was 72.8% of the maximum drawing ratio. A wet non-woven fabric was obtained in the same manner as in Example 1, using the obtained split-type conjugate fiber. In the obtained wet non-woven fabric, the division ratio of the split-type conjugate fiber was 30%. Also, an entangled non-woven fabric was obtained from the wet non-woven fabric in the same manner as in Example 1. In the obtained entangled non-woven fabric, the division ratio of the split-type conjugate fiber was 65%.

Comparative Example 4

A polypropylene-based resin (SA03D available from Japan Polypropylene Corporation) having a Q value of 2.7, an MFR 230 of 30 g/10 min, a tensile modulus of 1650 MPa, and a Rockwell hardness of 100 was used as the first component, and the same polymethyl pentene-based resin as used in Example 1 was used as the second component. An undrawn fiber bundle (spun filament) having a fineness of 10 dtex and a fiber cross section as shown in FIG. 1A having a gear-like shape divided into 8 parts with a hollow portion in the center was obtained by melt spinning the first component at a spinning temperature of 270° C. and the second component at a spinning temperature of 280° C. using a hollow 8 split type conjugate nozzle, with the conjugate ratio (volume ratio) between the first component and the second component being set to 5:5. The obtained undrawn fiber bundle was drawn at a drawing ratio of 5.9 times using a metal roll having a surface temperature of 130° C., whereby a split-type conjugate fiber having a fineness of 1.7 dtex and a hollow 8 split shape having a hollow ratio of 20% was obtained. The drawing ratio was 72.8% of the maximum drawing ratio. A wet non-woven fabric was obtained in the same manner as in Example 1, using the obtained split-type conjugate fiber. In the obtained wet non-woven fabric, the division ratio of the split-type conjugate fiber was 30%. Also, an entangled non-woven fabric was obtained from the wet non-woven fabric in the same manner as in Example 1. In the obtained entangled non-woven fabric, the division ratio of the split-type conjugate fiber was 65%.

Comparative Example 5

A polypropylene-based resin (S105H available from Prime Polymer Co., Ltd.) having a Q value of 4.7, an Mn of 42000, an Mw of 198000, an Mz of 662000, an MFR 230 of 22 g/10 min, a tensile modulus of 1600 MPa, and a Rockwell hardness of 100 was used as the first component, and the same polymethyl pentene-based resin as used in Example 1 was used as the second component. An undrawn fiber bundle (spun filament) having a fineness of 10 dtex and a fiber cross section as shown in FIG. 1A having a gear-like shape divided into 8 parts with a hollow portion in the center was obtained by melt spinning the first component at a spinning temperature of 290° C. and the second component at a spinning temperature of 300° C. using a hollow 8 split type conjugate nozzle, with the conjugate ratio (volume ratio) between the first component and the second component being set to 5:5. The obtained undrawn fiber bundle was drawn at a drawing ratio of 4.5 times using a metal roll having a surface temperature of 120° C., whereby a split-type conjugate fiber having a fineness of 2.2 dtex and a hollow 8 split shape having a hollow ratio of 20% was obtained. However, the frequency of the occurrence of yarn breakage when drawn was high and therefore mass production was difficult. The drawing ratio was 71.4% of the maximum drawing ratio. A wet non-woven fabric was obtained in the same manner as in Example 1, using the obtained split-type conjugate fiber. In the obtained wet non-woven fabric, the division ratio of the split-type conjugate fiber was 30%. Also, an entangled non-woven fabric was obtained from the wet non-woven fabric in the same manner as in Example 1. In the obtained entangled non-woven fabric, the division ratio of the split-type conjugate fiber was 65%.

Comparative Example 6

A polypropylene-based resin (SA01A available from Japan Polypropylene Corporation) having a Q value of 3.0, an Mn of 75000, an Mw of 230000, an MFR 230 of 9 g/10 min, a tensile modulus of 1650 MPa, and a Rockwell hardness of 100 was used as the first component, and the same polymethyl pentene-based resin as used in Example 1 was used as the second component. An undrawn fiber bundle (spun filament) having a fineness of 10 dtex and a fiber cross section as shown in FIG. 1A having a gear-like shape divided into 8 parts with a hollow portion in the center was obtained by melt spinning the first component at a spinning temperature of 290° C. and the second component at a spinning temperature of 300° C. using a hollow 8 split type conjugate nozzle, with the conjugate ratio (volume ratio) between the first component and the second component being set to 5:5. The obtained undrawn fiber bundle was drawn at a drawing ratio of 4.5 times using a metal roll having a surface temperature of 120° C., whereby a split-type conjugate fiber having a fineness of 2.2 dtex and a hollow 8 split shape having a hollow ratio of 20% was obtained. However, the frequency of the occurrence of yarn breakage when drawn was high and therefore mass production was difficult. The drawing ratio was 80.4% of the maximum drawing ratio. A wet non-woven fabric was obtained in the same manner as in Example 1, using the obtained split-type conjugate fiber. In the obtained wet non-woven fabric, the division ratio of the split-type conjugate fiber was 35%. Also, an entangled non-woven fabric was obtained from the wet non-woven fabric in the same manner as in Example 1. In the obtained entangled non-woven fabric, the division ratio of the split-type conjugate fiber was 70%.

Comparative Example 7

An undrawn fiber bundle (spun filament) having a fineness of 5.5 dtex and a fiber cross section as shown in FIG. 1A having a gear-like shape divided into 8 parts with a hollow portion in the center was obtained by performing melt spinning under the same conditions as in Comparative Example 1, except that the take-up speed during melt spinning was changed to 635 m per minute. The obtained undrawn fiber bundle was drawn at a drawing ratio of 3.2 times using a metal roll having a surface temperature of 130° C., whereby a split-type conjugate fiber having a fineness of 1.7 dtex and a hollow 8 split shape having a hollow ratio of 20% was obtained. The drawing ratio was 40.0% of the maximum drawing ratio. A wet non-woven fabric was obtained in the same manner as in Example 1, using the obtained split-type conjugate fiber. In the obtained wet non-woven fabric, the division ratio of the split-type conjugate fiber was 25%. Also, an entangled non-woven fabric was obtained from the wet non-woven fabric in the same manner as in Example 1. In the obtained entangled non-woven fabric, the division ratio of the split-type conjugate fiber was 55%.

Comparative Example 8

An undrawn fiber bundle (spun filament) having a fineness of 5.5 dtex and a fiber cross section as shown in FIG. 1A having a gear-like shape divided into 8 parts with a hollow portion in the center was obtained by performing melt spinning under the same conditions as in Comparative Example 3, except that the take-up speed during melt spinning was changed to 635 m per minute. The obtained undrawn fiber bundle was drawn at a drawing ratio of 3.2 times using a metal roll having a surface temperature of 130° C., whereby a split-type conjugate fiber having a fineness of 1.7 dtex and a hollow 8 split shape having a hollow ratio of 20% was obtained. The drawing ratio was 44.4% of the maximum drawing ratio. A wet non-woven fabric was obtained in the same manner as in Example 1, using the obtained split-type conjugate fiber. In the obtained wet non-woven fabric, the division ratio of the split-type conjugate fiber was 25%. Also, an entangled non-woven fabric was obtained from the wet non-woven fabric in the same manner as in Example 1. In the obtained entangled non-woven fabric, the division ratio of the split-type conjugate fiber was 55%.

Comparative Example 9

An undrawn fiber bundle (spun filament) having a fineness of 5.5 dtex and a fiber cross section as shown in FIG. 1A having a gear-like shape divided into 8 parts with a hollow portion in the center was obtained by performing melt spinning under the same conditions as in Comparative Example 4, except that the take-up speed during melt spinning was changed to 635 m per minute. The obtained undrawn fiber bundle was drawn at a drawing ratio of 3.2 times using a metal roll having a surface temperature of 130° C., whereby a split-type conjugate fiber having a fineness of 1.7 dtex and a hollow 8 split shape having a hollow ratio of 20% was obtained. The drawing ratio was 39.5% of the maximum drawing ratio. A wet non-woven fabric was obtained in the same manner as in Example 1, using the obtained split-type conjugate fiber. In the obtained wet non-woven fabric, the division ratio of the split-type conjugate fiber was 25%. Also, an entangled non-woven fabric was obtained from the wet non-woven fabric in the same manner as in Example 1. In the obtained entangled non-woven fabric, the division ratio of the split-type conjugate fiber was 55%.

The extensibility, splittability and the like of the polyolefin-based split-type conjugate fibers obtained in the examples and the comparative examples were measured in the manner described above, and the results are shown in Tables 1 to 3 given below. In Tables 1 to 3, the spinning conditions and drawing conditions used in the examples and the comparative examples also are shown.

TABLE 1

|  |  | Ex. 1 | Ex. 2 | Ex. 3 | Ex. 4 | Ex. 5 | Ex. 6 | Ex. 7 |
|---|---|---|---|---|---|---|---|---|
| First component (primary polypropylene) | Amount (mass %) | 100 | 100 | 100 | 100 | 100 | 100 | 50 |
|  | Q value before spinning | 10.7 | 10.7 | 10.7 | 10.7 | 10.7 | 10.7 | 10.7 |
|  | Mz before spinning | $3.0 \times 10^6$ | $3.0 \times 10^6$ | $3.0 \times 10^6$ | $3.0 \times 10^6$ | $3.0 \times 10^6$ | $3.0 \times 10^6$ | $3.0 \times 10^6$ |
|  | Mw before spinning | $5.4 \times 10^5$ | $5.4 \times 10^5$ | $5.4 \times 10^5$ | $5.4 \times 10^5$ | $5.4 \times 10^5$ | $5.4 \times 10^5$ | $5.4 \times 10^5$ |
|  | Mn before spinning | $5.1 \times 10^4$ | $5.1 \times 10^4$ | $5.1 \times 10^4$ | $5.1 \times 10^4$ | $5.1 \times 10^4$ | $5.1 \times 10^4$ | $5.1 \times 10^4$ |
|  | MFR (230° C. g/10 min) | 10 | 10 | 10 | 10 | 10 | 10 | 10 |
|  | Tensile Modulus (MPa) | 2400 | 2400 | 2400 | 2400 | 2400 | 2400 | 2400 |
| Second component | MFR (230° C. g/10 min) | 180 | 180 | 180 | 180 | 180 | 180 | 180 |
| Spinning conditions | Nozzle shape | Hollow 8 split shape | Hollow 8 split shape | Solid 8 split shape | Hollow 16 split shape | Solid 16 split shape | Hollow 8 split shape | Hollow 8 split shape |
|  | Spinning temperature of first component (° C.) | 350 | 350 | 350 | 350 | 350 | 350 | 320 |
|  | Spinning temperature of second component (° C.) | 280 | 280 | 280 | 280 | 280 | 280 | 280 |
|  | Take-up speed of undrawn fiber bundle (m/min) | 350 | 350 | 350 | 350 | 350 | 350 | 350 |
|  | Fineness of undrawn fiber (dtex) | 10 | 10 | 10 | 10 | 10 | 10 | 10 |
| Drawing conditions | Drawing method | Dry | Dry | Dry | Dry | Dry | Dry | Dry |
|  | Drawing temperature (° C.) | 140° C. | 140° C. | 140° C. | 140° C. | 140° C. | 140° C. | 140° C. |
|  | Maximum drawing ratio (Vmax) | 7.5 | 7.5 | 7.5 | 7.5 | 7.5 | 7.5 | 7.0 |
|  | Drawing ratio (V) | 5 | 5.9 | 5.9 | 5.9 | 5.9 | 5 | 5 |
|  | 100*V/Vmax (%) | 66.7 | 78.7 | 78.7 | 78.7 | 78.7 | 66.7 | 71.4 |
| Evaluation | Extensibility | 1 | 1 | 1 | 1 | 1 | 1 | 2 |
|  | Fineness (dtex) | 2.0 | 1.7 | 1.7 | 1.7 | 1.7 | 2.0 | 2.0 |
|  | Q value (first component) | 6.7 | 6.7 | 6.7 | 6.7 | 6.7 | 6.7 | 6.2 |
|  | Mz (first component) | $1.1 \times 10^6$ | $1.1 \times 10^6$ | $1.1 \times 10^6$ | $1.1 \times 10^6$ | $1.1 \times 10^6$ | $1.1 \times 10^6$ | $8.1 \times 10^5$ |
|  | Mw (first component) | $2.9 \times 10^5$ | $2.9 \times 10^5$ | $2.9 \times 10^5$ | $2.9 \times 10^5$ | $2.9 \times 10^5$ | $2.9 \times 10^5$ | $2.7 \times 10^5$ |
|  | Mn (first component) | $4.3 \times 10^4$ | $4.3 \times 10^4$ | $4.3 \times 10^4$ | $4.3 \times 10^4$ | $4.3 \times 10^4$ | $4.3 \times 10^4$ | $4.4 \times 10^4$ |
|  | Splittability (wet non-woven fabric) | 3 | 3 | 4 | 4 | 4 | 1 | 1 |
|  | Splittability (entangled non-woven fabric) | 1 | 1 | 1 | 1 | 1 | — | — |

TABLE 2

|  |  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| First component (primary polypropylene) | Q value before spinning | 5.3 | 2.8 | 4.4 | 2.7 | 4.7 | 3.0 |
|  | MFR before spinning (230° C. g/10 min) | 26 | 30 | 30 | 30 | 22 | 9 |
|  | Tensile modulus (MPa) | 1600 | 1650 | 1600 | 1650 | 1600 | 1650 |
| Second component | MFR (230° C. g/10 min) | 180 | 180 | 180 | 180 | 180 | 180 |
| Spinning conditions | Nozzle shape | Hollow 8 split shape | Hollow 8 split shape | Hollow 8 split shape | Hollow 8 split shape | Hollow 8 split shape | Hollow 8 split shape |
|  | Spinning temperature of first component (° C.) | 300 | 270 | 270 | 270 | 290 | 290 |
|  | Spinning temperature of second component (° C.) | 280 | 280 | 280 | 280 | 300 | 300 |
|  | Take-up speed of undrawn fiber bundle (m/min) | 350 | 350 | 350 | 350 | 350 | 350 |
|  | Fineness of undrawn fiber (dtex) | 10 | 10 | 10 | 10 | 10 | 10 |
| Drawing conditions | Drawing method | Dry | Dry | Dry | Dry | Dry | Dry |
|  | Drawing temperature (° C.) | 130° C. | 130° C. | 130° C. | 130° C. | 120° C. | 120° C. |
|  | Maximum drawing ratio (Vmax) | 8.0 | 8.1 | 8.1 | 8.1 | 6.3 | 5.6 |
|  | Drawing ratio (V) | 5.9 | 5.9 | 5.9 | 5.9 | 4.5 | 4.5 |
|  | 100*V/Vmax (%) | 73.8 | 72.8 | 72.8 | 72.8 | 71.4 | 80.4 |
| Evaluation | Extensibility | 1 | 1 | 1 | 1 | 4 | 5 |
|  | Fineness (dtex) | 1.7 | 1.7 | 1.7 | 1.7 | 2.2 | 2.2 |
|  | Splittability (wet non-woven fabric) | 5 | 5 | 5 | 5 | 5 | 5 |
|  | Splittability (entangled non-woven fabric) | 3 | 3 | 3 | 3 | 3 | 2 |

TABLE 3

|  |  | Comp. Ex. 7 | Comp. Ex. 8 | Comp. Ex. 9 |
|---|---|---|---|---|
| First component (primary polypropylene) | Q value before spinning | 5.3 | 4.4 | 2.7 |
|  | MFR before spinning (230° C.g/10 min) | 26 | 30 | 30 |
|  | Tensile modulus (MPa) | 1600 | 1600 | 1650 |

TABLE 3-continued

|  |  | Comp. Ex. 7 | Comp. Ex. 8 | Comp. Ex. 9 |
|---|---|---|---|---|
| Second component | MFR (230° C.g/10 min) | 180 | 180 | 180 |
| Spinning conditions | Nozzle shape | Hollow 8 split shape | Hollow 8 split shape | Hollow 8 split shape |
|  | Spinning temperature of first component (° C.) | 300 | 270 | 270 |
|  | Spinning temperature of second component (° C.) | 280 | 280 | 280 |
|  | Take-up speed of undrawn fiber bundle (m/min) | 635 | 635 | 635 |
|  | Fineness of undrawn fiber (dtex) | 5.5 | 5.5 | 5.5 |
| Drawing conditions | Drawing method | Dry | Dry | Dry |
|  | Drawing temperature (° C.) | 130° C. | 130° C. | 130° C. |
|  | Maximum drawing ratio (Vmax) | 8.0 | 7.2 | 8.1 |
|  | Drawing ratio (V) | 3.2 | 3.2 | 3.2 |
|  | 100 * V/Vmax (%) | 40.0 | 44.4 | 39.5 |
| Evaluation | Extensibility | 1 | 2 | 1 |
|  | Fineness (dtex) | 1.7 | 1.7 | 1.7 |
|  | Splittability (wet non-woven fabric) | 5 | 5 | 5 |
|  | Splittability (entangled non-woven fabric) | 4 | 4 | 4 |

From the results presented in Table 1 above, it can be seen that the polyolefin-based split-type conjugate fibers of Examples 1 to 7 that included a first component containing a polypropylene-based resin and a second component containing a polyolefin-based resin and in which a polypropylene-based resin having a Q value of 6 or greater and an MFR 230 of 5 g/10 min or greater and less than 23 g/10 min was used as a primary polypropylene-based resin in the first component had both excellent extensibility and splittability.

From comparisons between Examples 3 and 2 and between Examples 4 and 5, it was confirmed that in both the 8 split shape and the 16 split shape, the division ratio of the solid split-type conjugate fiber without a hollow portion was lower than that of the hollow split-type conjugate fiber. However, the reduction was about 5% in both cases, and the division ratio of the split-type conjugate fiber in the entangled non-woven fabric was 90% or greater in all of Examples 1 to 5. From the foregoing, it can be seen that in the polyolefin-based split-type conjugate fiber containing a polypropylene-based resin as a first component, by using a polypropylene-based resin having a Q value and an MFR that satisfies the above range as a primary polypropylene-based resin in the first component, the splittability and extensibility can be improved without being significantly influenced by the number of divisions and the presence/absence of the hollow portion.

On the other hand, as can be seen from Tables 2 and 3 above, with the split-type conjugate fibers of Comparative Examples 1 to 9 in which the primary polypropylene-based resin in the first component was a polypropylene-based resin having a Q value and an MFR, that did not satisfy the above range, fibers satisfying excellent extensibility and splittability were not obtained together. Particularly, in the split-type conjugate fiber of Comparative Example 6, the MFR of the primary polypropylene-based resin in the first component was extremely low, and thus the extensibility decreased significantly, and in addition, drawing at a high drawing ratio was difficult and the Q value was small, and thus the splittability was also low. The split-type conjugate fibers of Comparative Examples 1 to 4 had high extensibility, but the splittability decreased significantly as compared to the fibers of Examples 1 to 6. The reduction of the division ratio is presumably because in Comparative Examples 1 to 4, the primary polypropylene-based resin in the first component was a resin having a particularly large MFR 230 exceeding 23 g/10 min and thus the bonding interface between the polypropylene-based resin and the polymethyl pentene-based resin that was conjugated was strongly bonded when heat treated at a high temperature, and also the Q value was as small as 6.5 or less and thus a large number of amorphous regions remained in the drawn fiber.

In Comparative Examples 1, 3 and 4, the drawing treatment was performed at a drawing ratio higher than that of Comparative Examples 7 to 9, and thus the crystallization of the fiber was facilitated as compared to Comparative Examples 7 to 9 and thus the division ratio was improved. However, in Comparative Examples 1, 3 and 4, because the polypropylene-based resin having a low Q value in which the amount of high molecular weight polypropylene that is likely to crystallize was small was used, crystallization did not proceed sufficiently even through the drawing treatment, a large number of amorphous regions remained in the drawn fiber, and the polypropylene-based resin used had an MFR of 25 g/10 min or greater, as a result of which the bonding interface between the polypropylene-based resin and the polymethyl pentene-based resin that was conjugated was strongly bonded when heat treated at a high temperature and the division ratio thereby decreased as compared to the split-type conjugate fibers of the present invention produced in Examples 1 to 7.

The single fiber strength and fiber elongation of the split-type conjugate fibers (drawn filaments) produced in Examples 1 and 7 and Comparative Example 6 were measured in the manner described above, and the results are shown in Table 4 given below.

TABLE 4

|  | Single fiber strength (cN/dtex) | Fiber elongation (%) |
|---|---|---|
| Ex. 1 | 5.28 | 30.5 |
| Ex. 7 | 5.71 | 31.3 |
| Comp. Ex. 6 | 5.16 | 32.2 |

As can be seen from Table 4, the split-type conjugate fibers of Examples 1 and 7 have a superior single fiber strength to that of Comparative Example 6. This is presumably because the drawing ratio in Examples 1 and 7 was greater than that of Comparative Example 6. Also, the split-type conjugate fibers of Examples 1 and 7 had good extensibility despite the fact that the drawing ratio in Examples 1 and 7 was greater than that of Comparative Example 6. This is presumably because the maximum drawing ratio in Examples 1 and 7 was greater than that of Comparative Example 6.

Example 8

The split-type conjugate fiber obtained in Example 2 was cut so as to have a fiber length of 3 mm. As the binder fiber, a core sheath type conjugate fiber (NBF (H) available from Daiwabo Polytec Co., Ltd.) was prepared that had a fineness of 0.8 dtex and a fiber length of 5 mm and contained polypropylene as the core component and polyethylene as the sheath component. The polyolefin-based split-type conjugate fiber having a fiber length of 3 mm obtained above was mixed with the binder fiber at a mass ratio of 30:70, and an aqueous dispersion slurry was prepared such that the concentration of the mixed staple fiber was 0.01 mass %. The prepared slurry was stirred by a home use mixer at 3000 revolutions/min for one minute so as to split the polyolefin-based split-type conjugate fiber into respective resin components to form ultrafine fibers, and at the same time, a slurry in which the respective constituent fibers were uniformly dispersed was obtained. The obtained slurry was subjected to wet papermaking, and a fiber web having a basis weight of approximately 52 g/m² was produced. The fiber web was transferred with a transfer support, and subjected to a heat application treatment using a cylinder dryer heated to 140° C. for 45 seconds, so as to dry the fiber web and at the same time bond the fibers with the core sheath type conjugate fiber (binder fiber), whereby a thermally bonded non-woven fabric was obtained.

Next, the obtained thermally bonded non-woven fabric was subjected to thickness processing using a heat roll under conditions of a temperature of 60° C. and a nip pressure of approximately 35 kgf/cm² (3.3 MPa) so as to adjust the thickness of the thermally bonded non-woven fabric to approximately 120 μm, whereby a battery separator was produced.

Comparative Example 10

A battery separator was obtained in the same manner as in Example 8, except that the split-type conjugate fiber obtained in Comparative Example 6 was used.

The battery separators (non-woven fabrics) obtained in Example 8 and Comparative Example 10 were measured for basis weight, thickness, air permeability and puncture strength in the manner described above, and the results are shown in Table 5 given below.

TABLE 5

|  | Basis Weight (g/cm²) | Thickness (μm) | Air permeability (ccs) | Puncture strength (N) |
| --- | --- | --- | --- | --- |
| Ex. 8 | 52.0 | 119 | 22.7 | 13.12 |
| Comp. Ex. 10 | 53.1 | 125 | 23.4 | 12.86 |

As can be seen from Table 5, the puncture strength of the battery separator (non-woven fabric) of Example 8 is superior to that of Comparative Example 10. This is presumably because a polypropylene-based resin having a Q value of 6 or greater and an MFR 230 of 5 g/10 min or greater and less than 23 g/10 min was used as the primary polypropylene-based resin of the first component in Example 8.

Example 9

A split-type conjugate fiber having a fiber cross section as shown in FIG. 2A divided into 16 parts and having a hollow portion in the center at a hollow ratio of 20% was produced by using a homopolypropylene resin, a Q value of 10.7, an Mn of 51000, an Mw of 540000, an Mz of 3000000, an MFR 230 of 10 g/10 min, and a tensile modulus of 2400 MPa as the first component and the core component of the second component and a high density polyethylene (HE 481 available from Japan Polyethylene Corporation) as the sheath component of the second component.

Specifically, the split-type conjugate fiber was produced in the manner described below. First, an undrawn fiber bundle (spun filament) having a fineness of 4 dtex was obtained by performing melt extrusion using a split type conjugate nozzle provided with 205 nozzle holes, with the volume ratio between polypropylene resin and polyethylene being set to 5:5 (the volume ratio between the first component and the second component=2.5:7.5) under the conditions of a spinning temperature of 290° C., a discharge amount of 0.35 g/pore and a take-up speed of 880 m/min. Next, the obtained spun filament was subjected to dry drawing at 105° C. to stretch the spun filament twice the original length, whereby a drawn filament having a fineness of 2 dtex was obtained. A fiber treating agent was added to the obtained drawn filament, and thereafter the filament was cut to a fiber length of 3 mm, whereby a split-type conjugate fiber in the form of short fibers was obtained.

Next, a fiber web was produced by a wet papermaking method using the split-type conjugate fiber having a fiber length of 3 mm obtained above. Specifically, a slurry was prepared such that the fiber concentration was 0.01 mass %, and then stirred with a pulper at a revolution speed of 2000 rpm for 5 minutes so as to dissociate the fiber and at the same time split the split-type conjugate fiber, whereby a ultrafine fiber A and a ultrafine fiber B were formed. After that, wet papermaking was performed using a cylinder wet papermaking machine such that a web having a basis weight 80 g/m² was obtained. The obtained wet paper web was transferred with a transfer support and subjected to a heat application treatment using a cylinder dryer heated to 140° C. for 45 seconds so as to dry the wet paper web and at the same time bond the fibers with the sheath component of the ultrafine fiber B, whereby a non-woven fabric was obtained. In the obtained non-woven fabric, the ultrafine fiber A had an L/D in a cross section of the fiber of 1.7 and the ultrafine fiber B had an VD in a cross section of the fiber of 1.0.

Example 10

A split-type conjugate fiber having a fiber length of 3 mm and a non-woven fabric were obtained in the same manner as in Example 9, except that an undrawn fiber bundle (spun filament) was produced by changing the volume ratio between polypropylene resin and polyethylene to 7:3 (the volume ratio between the first component and the second component=3.5:6.5). In the non-woven fabric of Example 10, the ultrafine fiber A had an L/D in a cross section of the fiber of 1.5, and the ultrafine fiber B had an in a cross section of the fiber of 1.1.

Example 11

A split-type conjugate fiber having a fiber length of 3 mm and a non-woven fabric were obtained in the same manner as in Example 9, except that, in order to have a fiber cross section shown in FIG. 2B, a undrawn fiber bundle (spun filament) having a fineness of 6 dtex was obtained by performing melt extrusion under the conditions of a spinning temperature of 290° C., a discharge amount of 0.53 g/pore and a take-up speed of 880 m/min by changing the split type conjugate nozzle, and the obtained spun filament was subjected to dry drawing at 105° C. to stretch the spun filament three times the original length, so as to give a drawn filament having a fineness of 2 dtex. In the non-woven fabric of Example 11, the ultrafine fiber A had an L/D in a cross section of the fiber of 2.9, and the ultrafine fiber B had an L/D in a cross section of the fiber of 1.6.

Example 12

A split-type conjugate fiber was produced by using, in order to have a fiber cross section shown in FIG. 1D, the polypropylene resin that was used as the first component in Example 9 as the first component and the polyethylene that was used as the second component in Example 9 as the second component. Specifically, the split-type conjugate fiber was produced in the following manner. First, an undrawn fiber bundle (spun filament) having a fineness of 6 dtex was obtained by performing melt extrusion using a split type conjugate nozzle provided with 300 nozzle holes, with the volume ratio between polypropylene resin and polyethylene being set to 5:5 (the volume ratio between the first component and the second component=5:5) under the conditions of a spinning temperature of 290° C., a discharge amount of 0.36 g/pore and a take-up speed of 600 m/min. Next, the obtained spun filament was subjected to dry drawing at 105° C. to stretch the spun filament three times the original length, whereby a drawn filament having a fineness of 2 dtex was obtained. A fiber treating agent was added to the obtained drawn filament, and thereafter the filament was cut to a fiber length of 3 mm, whereby a split-type conjugate fiber in the form of short fibers was obtained. Next, a non-woven fabric was obtained in the same manner as in Example 9, using the obtained split-type conjugate fiber having a fiber length of 3 mm. In the non-woven fabric of Example 12, the ultrafine fiber A had an L/D in a cross section of the fiber of 2.0, and the ultrafine fiber B had an L/D in a cross section of the fiber of 2.0.

Comparative Example 11

A split-type conjugate fiber having a fiber length of 3 mm and a non-woven fabric were obtained in the same manner as in Example 9, except that, as the first component and the core component of the second component, a polypropylene resin (SA03A available from Japan Polypropylene Corporation) having a Q value of 5.3, an Mn of 32000, an Mw of 171000, an Mz of 700000, an MFR 230 of 26 g/10 min and a tensile modulus of 1600 MPa was used. In the non-woven fabric of Comparative Example 11, the ultrafine fiber A had an L/D in a cross section of the fiber of 1.7, and the ultrafine fiber B had an L/D in a cross section of the fiber of 1.0.

Comparative Example 12

A split-type conjugate fiber having a fiber length of 3 mm and a non-woven fabric were obtained in the same manner as in Example 10, except that, as the first component and the core component of the second component, a polypropylene resin (SA03A available from Japan Polypropylene Corporation) having a Q value of 5.3, an Mn of 32000, an Mw of 171000, an Mz of 700000, an MFR 230 of 26 g/10 min and a tensile modulus of 1600 MPa was used. In the non-woven fabric of Comparative Example 12, the ultrafine fiber A had an L/D in a cross section of the fiber of 1.5, and the ultrafine fiber B had an L/D in a cross section of the fiber of 1.1.

Comparative Example 13

A split-type conjugate fiber having a fiber length of 3 mm and a non-woven fabric were obtained in the same manner as in Example 11, except that, as the first component and the core component of the second component, a polypropylene resin (SA03A available from Japan Polypropylene Corporation) having a Q value of 5.3, an Mn of 32000, an Mw of 171000, an Mz of 700000, an MFR 230 of 26 g/10 min, and a tensile modulus of 1600 MPa was used. In the non-woven fabric of Comparative Example 13, the ultrafine fiber A had an L/D in a cross section of the fiber of 2.9, and the ultrafine fiber B had an L/D in a cross section of the fiber of 1.6.

Comparative Example 14

A split-type conjugate fiber having a fiber length of 3 mm and a non-woven fabric were obtained in the same manner as in Example 12, except that a polypropylene resin (SA03A available from Japan Polypropylene Corporation) having a Q value of 5.3, an Mn of 32000, an Mw of 171000, an Mz of 700000, an MFR 230 of 26 g/10 min and a tensile modulus of 1600 MPa was used as the first component. In the non-woven fabric of Comparative Example 14, the ultrafine fiber A had an L/D in a cross section of the fiber of 2.0, and the ultrafine fiber B had an L/D in a cross section of the fiber of 2.0.

Tables 6 and 7 given below show the configuration and physical properties, such as fineness, of the split-type conjugate fibers of Examples 9 to 12 and Comparative Examples 11 to 14, as well as the division ratio, thickness, tensile strength and puncture strength of the non-woven fabrics of Examples 9 to 12 and Comparative Examples 11 to 14.

TABLE 6

| | | Ex. 9 | Ex. 10 | Ex. 11 | Ex. 12 |
|---|---|---|---|---|---|
| First component (primary polypropylene) | Amount (mass %) | 100 | 100 | 100 | 100 |
| | Q value before spinning | 10.7 | 10.7 | 10.7 | 10.7 |
| | Mz before spinning | $3.0 \times 10^6$ | $3.0 \times 10^6$ | $3.0 \times 10^6$ | $3.0 \times 10^6$ |
| | Mw before spinning | $5.4 \times 10^5$ | $5.4 \times 10^5$ | $5.4 \times 10^5$ | $5.4 \times 10^5$ |
| | Mn before spinning | $5.1 \times 10^4$ | $5.1 \times 10^4$ | $5.1 \times 10^4$ | $5.1 \times 10^4$ |
| | MFR (230° C.g/10 min) | 10 | 10 | 10 | 10 |
| | Tensile modulus (MPa) | 2400 | 2400 | 2400 | 2400 |
| Second component | Core component | Same as primary polypropylene of first component | Same as primary polypropylene of first component | Same as primary polypropylene of first component | Polyethylene |
| | Sheath component | Polyethylene | Polyethylene | Polyethylene | |
| Drawing conditions | Drawing method | Dry | Dry | Dry | Dry |
| | Drawing temperature (° C.) | 105° C. | 105° C. | 105° C. | 105° C. |
| | Drawing ratio (V) | 2 | 2 | 3 | 3 |

TABLE 6-continued

|  |  | Ex. 9 | Ex. 10 | Ex. 11 | Ex. 12 |
|---|---|---|---|---|---|
| Physical properties of split-type conjugate fiber | Q value (first component) | 6.7 | 6.7 | 6.7 | 6.7 |
|  | Mz (first component) | $1.1 \times 10^6$ | $1.1 \times 10^6$ | $1.1 \times 10^6$ | $1.1 \times 10^6$ |
|  | Mw (first component) | $2.9 \times 10^5$ | $2.9 \times 10^5$ | $2.9 \times 10^5$ | $2.9 \times 10^5$ |
|  | Mn (first component) | $4.3 \times 10^4$ | $4.3 \times 10^4$ | $4.3 \times 10^4$ | $4.3 \times 10^4$ |
|  | Fiber cross section | FIG. 2A | FIG. 2A | FIG. 2B | FIG. 1D |
|  | Fineness   Before drawing | 4.0 | 4.0 | 6.0 | 6.0 |
|  | (dtex)       After drawing | 2.0 | 2.0 | 2.0 | 2.0 |
| Physical properties of non-woven fabric | Fineness  Ultrafine fiber A | 0.06 | 0.09 | 0.06 | 0.13 |
|  | (dtex)     Ultrafine fiber B | 0.19 | 0.16 | 0.19 | 0.13 |
|  | L/D        Ultrafine fiber A | 1.7 | 1.5 | 2.9 | 2.0 |
|  |                Ultrafine fiber B | 1.0 | 1.1 | 1.6 | 2.0 |
|  | Division ratio (%) | 97 | 95 | 91 | 90 |
|  | Thickness (μm) | 120 | 125 | 120 | 120 |
|  | Tensile strength (N/5 cm) | 96 | 88 | 80 | 38 |
|  | Puncture strength (N) | 10.6 | 12.1 | 10.6 | 6.5 |

TABLE 1

|  |  |  | Comp. Ex. 11 | Comp. Ex. 12 | Comp. Ex. 13 | Comp. Ex 14 |
|---|---|---|---|---|---|---|
| First component (primary polypropylene) | Amount (mass %) | | 100 | 100 | 100 | 100 |
|  | Q value before spinning | | 5.3 | 5.3 | 5.3 | 5.3 |
|  | Mz before spinning | | $0.7 \times 10^6$ | $0.7 \times 10^6$ | $0.7 \times 10^6$ | $0.7 \times 10^6$ |
|  | Mw before spinning | | $1.71 \times 10^5$ | $1.71 \times 10^5$ | $1.71 \times 10^5$ | $1.71 \times 10^5$ |
|  | Mn before spinning | | $3.2 \times 10^4$ | $3.2 \times 10^4$ | $3.2 \times 10^4$ | $3.2 \times 10^4$ |
|  | MFR (230° C. g/10 min) | | 26 | 26 | 26 | 26 |
|  | Tensile modulus (MPa) | | 1600 | 1600 | 1600 | 1600 |
| Second component | Core component | | Same as primary polypropylene of first component | Same as primary polypropylene of first component | Same as primary polypropylene of first component | Polyethylene |
|  | Sheath component | | Polyethylene | Polyethylene | Polyethylene |  |
| Drawing conditions | Drawing method | | Dry | Dry | Dry | Dry |
|  | Drawing temperature (° C.) | | 105° C. | 105° C. | 105° C. | 105° C. |
|  | Drawing ratio (V) | | 2 | 2 | 3 | 3 |
| Physical properties of split-type conjugate fiber | Fiber cross section | | FIG. 2A | FIG. 2A | FIG. 2B | FIG. 1D |
|  | Fineness (dtex) | Before drawing | 4.0 | 4.0 | 6.0 | 6.0 |
|  |  | After drawing | 2.0 | 2.0 | 2.0 | 2.0 |
| Physical properties of non-woven fabric | Fineness (dtex) | Ultrafine fiber A | 0.06 | 0.09 | 0.06 | 0.13 |
|  |  | Ultrafine fiber B | 0.19 | 0.16 | 0.19 | 0.13 |
|  | L/D | Ultrafine fiber A | 1.7 | 1.5 | 2.9 | 2.0 |
|  |  | Ultrafine fiber B | 1.0 | 1.1 | 1.6 | 2.0 |
|  | Division ratio (%) | | 97 | 95 | 91 | 90 |
|  | Thickness (μm) | | 117 | 123 | 113 | 128 |
|  | Tensile strength (N/5 cm) | | 88 | 85 | 88 | 45 |
|  | Puncture strength (N) | | 8.1 | 9.9 | 7.6 | 4.1 |

A comparison between Example 9 and Comparative Example 11 shows that despite the fact that there was no difference in the division ratio of the split-type conjugate fibers and the fineness of the split ultrafine fibers, Example 9 exhibited a higher puncture strength. The same is true for comparisons between Example 10 and Comparative Example 12, between Example 11 and Comparative Example 13, and between Example 12 and Comparative Example 14. This is presumably because in Examples 9 to 11, a polypropylene-based resin having a Q value of 6 or greater and an MFR 230 of 5 g/10 min or greater and less than 23 g/10 min was used as the primary polypropylene-based resin in the first component.

Also, the non-woven fabrics of Examples 9 to 11 exhibited a tensile strength higher than that of Example 12. This is presumably because the ultrafine fiber B constituting the non-woven fabrics of Example 9 to 11 was of core sheath type, and thus the ultrafine fibers were strongly bonded by the sheath component of the ultrafine fiber B.

INDUSTRIAL APPLICABILITY

The polyolefin-based split-type conjugate fiber of the present invention can be used in various applications including various types of wiping products such as personal and/or objective wipers, artificial leathers, sanitary materials, filters and battery separators.

DESCRIPTION OF SYMBOLS

1 First Component
2 Second Component
2a Core Component
2b Sheath Component
3 Hollow Portion
10 Split-Type Conjugate Fiber

The invention claimed is:

1. A polyolefin-based split-type conjugate fiber obtained by composite spinning comprising:
   a first component comprising a polypropylene-based resin; and
   a second component comprising a polyolefin-based resin,
   wherein the first component comprises, as a primary component, a polypropylene-based resin having a Q value of 6 or greater, where the Q value is a ratio of weight average molecular weight Mw relative to number average molecular weight Mn, and a melt flow rate MFR of 8 g/10 min or greater and less than 16 g/10 min according to JIS K 7210, where the MFR is measured at a temperature of 230° C. under a load of 2.16 kgf, which is equivalent to 21.18 N,
   wherein the polypropylene-based resin contained as the primary component in the first component has a tensile modulus measured according to the JIS K 7161 in a range from 2000 MPa to 2700 MPa,
   the polypropylene-based resin as the primary component in the first component has a z average molecular weight Mz of 800,000 or greater and less than 4,000,000 and a Weight average molecular weight Mw of 800,000 or less,
   the polyolefin-based resin contained in the second component is a polymethyl pentene-based resin, and an amount of the polymethyl pentene-based resin in the second component is 80 mass % or greater, and
   in a cross section of the polyolefin-based split-type conjugate fiber, the first component and the second component are adjacent to each other.

2. The polyolefin-based split-type conjugate fiber according to claim 1,
   wherein the conjugate fiber is split into ultrafine split fibers, which form a web, by stirring of an aqueous slurry comprising cut fibers of the conjugate fiber without applying a treatment with a columnar stream of high pressure water, wherein the ultrafine split fibers have fineness of equal to or more than 0.006 dtex and less than 0.6 dtex.

3. The polyolefin-based split-type conjugate fiber according to claim 1,
   wherein the cut fibers of the conjugate fiber are split by the stirring at a stirring speed in a range from 3,000 revolutions/min. to 6,000 revolutions/min. for one or two minutes.

4. A method for producing a polyolefin-based split-type conjugate fiber comprising:
   a step of melt spinning a first component comprising a polypropylene-based resin and a second component comprising a polyolefin-based resin by using a split type conjugate nozzle so as to form an undrawn fiber bundle; and drawing the obtained undrawn fiber bundle,
   wherein the first component comprises, as a primary component, a polypropylene-based resin having a Q value before spinning of 6 or greater, where the Q value is a ratio of weight average molecular weight Mw relative to number average molecular weight Mn and a melt flow rate MFR before spinning of 8 g/10 min or greater and less than 16 g/10 min according to JIS K 7210, where the MFR is measured at a temperature of 230° C. under a load of 2.16 kgf, which is equivalent to 21.18 N,
   wherein the polypropylene-based resin contained as the primary component in the first component has a tensile modulus measured according to the JIS K 7161 in a range from 2000 MPa to 2700 MPa,
   the polypropylene-based resin as the primary component in the first component has a z average molecular weight Mz of 800,000 or greater and less than 4,000,000 and a weight average molecular weight Mw of 800,000 or less,
   the polyolefin-based resin contained in the second component is a polymethyl pentene-based resin, and an amount of the polymethyl pentene-based resin in the second component is 80 mass % or greater.

5. The method for producing a polyolefin-based split-type conjugate fiber according to claim 4,
   wherein the polypropylene-based resin contained as the primary component in the first component has the Q value before spinning of 8 or greater.

6. The method for producing a polyolefin-based split-type conjugate fiber according to claim 4,
   wherein a drawing ratio of the polyolefin-based split-type conjugate fiber is in a range from 60 to 90% relative to a maximum drawing ratio $V_{max}$ and is 4.5 times or greater,
   wherein the maximum drawing ratio $V_{max}$ is a ratio V2/V1, where V1 is a dispensing speed of the undrawn fiber bundle from a roll of the undrawn fiber bundle, which is 10 m/sec., and V2 is a maximum winding speed of a winding metal roll for the fiber bundle, at which the undrawn fiber bundle is broken, wherein a winding speed of the winding metal is gradually increased from 10 msec. until reaching the maximum winding speed V2.

7. A fiber assembly comprising a polyolefin-based split-type conjugate fiber, which is obtained by composite spinning, comprising:
   a first component comprising a polypropylene-based resin; and
   a second component comprising a polyolefin-based resin,
   the fiber assembly comprising the polyolefin-based split-type conjugate fiber in an amount of 10 mass % or greater,
   wherein the first component comprises, as a primary component, a polypropylene-based resin having a Q value of 6 or greater, where the Q value is a ratio of weight average molecular weight Mw relative to number average molecular weight Mn and a melt flow rate MFR of 8 g/10 min or greater and less than 16 g/10 min according to JIS K 7210, where the MFR is measured at a temperature of 230° C. under a load of 2.16 kgf, which is equivalent to 21.18 N,
   wherein the polypropylene-based resin contained as the primary component in the first component has a tensile modulus measured according to the JIS K 7161 in a range from 2000 MPa to 2700 MPa,
   the polypropylene-based resin as the primary component in the first component has a z average molecular weight Mz of 800,000 or greater and less than 4,000,000 and a weight average molecular weight Mw of 800,000 or less,
   the polyolefin-based resin contained in the second component is a polymethyl pentene-based resin, and an amount of the polymethyl pentene-based resin in the second component is 80 mass % or greater, and
   in a cross section of the polyolefin-based split-type conjugate fiber, the first component and the second component are adjacent to each other.

8. The fiber assembly according to claim 7,
   wherein the conjugate fiber is split into ultrafine split fibers, which form a web, by stirring of an aqueous slurry comprising cut fibers of the conjugate fiber without applying a treatment with a columnar stream of high pressure water, wherein the ultrafine split fibers have fineness of equal to or more than 0.006 dtex and less than 0.6 dtex.

9. The fiber assembly according to claim 7,
wherein the cut fibers of the conjugate fiber are split by the stirring at a stirring speed in a range from 3,000 revolutions/min. to 6,000 revolutions/min. for one or two minutes.

10. A battery separator comprising a polyolefin-based split-type conjugate fiber, which is obtained by composite spinning, comprising:
a first component comprising a polypropylene-based resin; and
a second component comprising a polyolefin-based resin, the battery comprising the polyolefin-based split-type conjugate fiber in an amount of 10 mass % or greater,
wherein the first component comprises, as a primary component, a polypropylene-based resin having a Q value of 6 or greater, where the Q value is a ratio of weight average molecular weight Mw relative to number average molecular weight Mn and a melt flow rate MFR of 8 g/10 min or greater and less than 16 g/10 min according to JIS K 7210, where the MFR is measured at a temperature of 230° C. under a load of 2.16 kgf, which is equivalent to 21.18 N,
wherein the polypropylene-based resin contained as the primary component in the first component has a tensile modulus measured according to the JIS K 7161 in a range from 2000 MPa to 2700 MPa,
the polypropylene-based resin as the primary component in the first component has a z average molecular weight Mz of 800,000 or greater and less than 4,000,000 and a weight average molecular weight Mw of 800,000 or less,
the polyolefin-based resin contained in the second component is a polymethyl pentene-based resin, and an amount of the polymethyl pentene-based resin in the second component is 80 mass % or greater, and
in a cross section of the polyolefin-based split-type conjugate fiber, the first component and the second component are adjacent to each other.

11. The battery separator according to claim 10,
wherein the conjugate fiber is split into ultrafine split fibers, which form a web, by stirring of an aqueous slurry comprising cut fibers of the conjugate fiber without applying a treatment with a columnar stream of high pressure water, wherein the ultrafine split fibers have fineness of equal to or more than 0.006 dtex and less than 0.6 dtex.

12. The battery separator according to claim 10,
wherein the cut fibers of the conjugate fiber are split by the stirring at a stirring speed in a range from 3,000 revolutions/min. to 6,000 revolutions/min. for one or two minutes.

* * * * *